United States Patent
Oehring et al.

(10) Patent No.: US 10,648,311 B2
(45) Date of Patent: May 12, 2020

(54) HIGH HORSEPOWER PUMPING CONFIGURATION FOR AN ELECTRIC HYDRAULIC FRACTURING SYSTEM

(71) Applicant: U.S. Well Services, Inc., Houston, TX (US)

(72) Inventors: Jared Oehring, Houston, TX (US); Brandon N. Hinderliter, Houston, TX (US); Lon Robinson, Houston, TX (US)

(73) Assignee: U.S. Well Services, LLC, Houston, TX (US)

( * ) Notice: Subject to any disclaimer, the term of this patent is extended or adjusted under 35 U.S.C. 154(b) by 0 days.

(21) Appl. No.: 16/210,749

(22) Filed: Dec. 5, 2018

(65) Prior Publication Data

US 2019/0169971 A1     Jun. 6, 2019

Related U.S. Application Data

(60) Provisional application No. 62/595,411, filed on Dec. 6, 2017, provisional application No. 62/594,925, filed on Dec. 5, 2017.

(51) Int. Cl.
*E21B 43/26* (2006.01)
*F04B 23/04* (2006.01)
(Continued)

(52) U.S. Cl.
CPC .............. *E21B 43/26* (2013.01); *F04D 13/06* (2013.01); *H02J 3/38* (2013.01); *H02P 5/74* (2013.01); *F04D 7/00* (2013.01)

(58) Field of Classification Search
CPC ........... E21B 43/26; F04B 23/04; F04B 17/03
See application file for complete search history.

(56) References Cited

U.S. PATENT DOCUMENTS 1,656,861 A   1/1928   Leonard
1,671,436 A   5/1928   Melott
(Continued)

FOREIGN PATENT DOCUMENTS

AU   2007340913   7/2008
CA   2406801      11/2001
(Continued)

OTHER PUBLICATIONS

UK Power Networks—Transformers to Supply Heat to Tate Modern—from Press Releases May 16, 2013.
(Continued)

*Primary Examiner* — Kenneth L Thompson
(74) *Attorney, Agent, or Firm* — Hogan Lovells US LLP

(57) ABSTRACT

Embodiments include a hydraulic fracturing system for fracturing a subterranean formation. The system includes an electric pump, arranged on a first support structure, the electric pump coupled to a well associated with the subterranean formation and powered by at least one electric motor, and configured to pump fluid into a wellbore associated with the well at a high pressure so that the fluid passes from the wellbore into the subterranean formation and fractures the subterranean formation. The system also includes support equipment, arranged on a second support structure, electrically coupled to the electric pump, wherein the support equipment includes at least a transformer for distributing power to the electric pump, the power being received from at least one generator at a voltage higher than an operating voltage of the electric pump.

20 Claims, 11 Drawing Sheets

(51) Int. Cl.
 *F04D 13/06* (2006.01)
 *H02J 3/38* (2006.01)
 *H02P 5/74* (2006.01)
 *F04D 7/00* (2006.01)

(56) References Cited

U.S. PATENT DOCUMENTS

| | | |
|---|---|---|
| 2,004,077 A | 6/1935 | McCartney |
| 2,183,364 A | 12/1939 | Bailey |
| 2,220,622 A | 11/1940 | Aitken |
| 2,248,051 A | 7/1941 | Armstrong |
| 2,407,796 A | 9/1946 | Page |
| 2,416,848 A | 3/1947 | Rothery |
| 2,753,940 A | 7/1956 | Bonner |
| 3,061,039 A | 10/1962 | Peters |
| 3,066,503 A | 12/1962 | Fleming |
| 3,302,069 A | 1/1967 | Webster |
| 3,334,495 A | 8/1967 | Jensen |
| 3,722,595 A | 3/1973 | Kiel |
| 3,764,233 A | 10/1973 | Strickland |
| 3,773,140 A | 11/1973 | Mahajan |
| 3,837,179 A | 9/1974 | Barth |
| 3,849,662 A | 11/1974 | Blaskowski |
| 3,881,551 A | 5/1975 | Terry |
| 4,037,431 A | 7/1977 | Sugimoto |
| 4,100,822 A | 7/1978 | Rosman |
| 4,151,575 A | 4/1979 | Hogue |
| 4,226,299 A | 10/1980 | Hansen |
| 4,265,266 A | 5/1981 | Kierbow et al. |
| 4,432,064 A | 2/1984 | Barker |
| 4,442,665 A | 4/1984 | Fick et al. |
| 4,456,092 A | 6/1984 | Kubozuka |
| 4,506,982 A | 3/1985 | Smithers et al. |
| 4,512,387 A | 4/1985 | Rodriguez |
| 4,529,887 A | 7/1985 | Johnson |
| 4,538,916 A | 9/1985 | Zimmerman |
| 4,676,063 A | 6/1987 | Goebel et al. |
| 4,759,674 A | 7/1988 | Schroder |
| 4,793,386 A | 12/1988 | Sloan |
| 4,845,981 A | 7/1989 | Pearson |
| 4,922,463 A | 5/1990 | Del Zotto et al. |
| 5,006,044 A | 4/1991 | Walker, Sr. |
| 5,025,861 A | 6/1991 | Huber et al. |
| 5,050,673 A | 9/1991 | Baldridge |
| 5,130,628 A | 7/1992 | Owen |
| 5,131,472 A | 7/1992 | Dees et al. |
| 5,172,009 A | 12/1992 | Mohan |
| 5,189,388 A | 2/1993 | Mosley |
| 5,366,324 A | 11/1994 | Arlt |
| 5,422,550 A | 6/1995 | McClanahan |
| 5,548,093 A | 8/1996 | Sato |
| 5,590,976 A | 1/1997 | Kilheffer et al. |
| 5,655,361 A | 8/1997 | Kishi |
| 5,736,838 A | 4/1998 | Dove et al. |
| 5,755,096 A | 5/1998 | Holleyman |
| 5,790,972 A | 8/1998 | Kohlenberger |
| 5,865,247 A | 2/1999 | Paterson |
| 5,879,137 A | 3/1999 | Yie |
| 5,894,888 A | 4/1999 | Wiemers |
| 5,907,970 A | 6/1999 | Havlovick et al. |
| 6,138,764 A | 10/2000 | Scarsdale et al. |
| 6,142,878 A | 11/2000 | Barin |
| 6,164,910 A | 12/2000 | Mayleben |
| 6,202,702 B1 | 3/2001 | Ohira |
| 6,208,098 B1 | 3/2001 | Kume |
| 6,254,462 B1 | 7/2001 | Kelton |
| 6,271,637 B1 | 8/2001 | Kushion |
| 6,273,193 B1 | 8/2001 | Hermann |
| 6,315,523 B1 | 11/2001 | Mills |
| 6,477,852 B2 | 11/2002 | Dodo |
| 6,484,490 B1 | 11/2002 | Olsen |
| 6,491,098 B1 | 12/2002 | Dallas |
| 6,529,135 B1 | 3/2003 | Bowers et al. |
| 6,776,227 B2 | 8/2004 | Beida |
| 6,802,690 B2 | 10/2004 | Han |
| 6,808,303 B2 | 10/2004 | Fisher |
| 6,931,310 B2 | 8/2005 | Shimizu et al. |
| 6,936,947 B1 | 8/2005 | Leijon |
| 7,082,993 B2 | 8/2006 | Ayoub |
| 7,104,233 B2 | 9/2006 | Ryczek et al. |
| 7,170,262 B2 | 1/2007 | Pettigrew |
| 7,173,399 B2 | 2/2007 | Sihler |
| 7,308,933 B1 | 12/2007 | Mayfield |
| 7,312,593 B1 | 12/2007 | Streicher et al. |
| 7,336,514 B2 | 2/2008 | Amarillas |
| 7,445,041 B2 | 11/2008 | O'Brien |
| 7,494,263 B2 | 2/2009 | Dykstra et al. |
| 7,500,642 B2 | 3/2009 | Cunningham |
| 7,525,264 B2 | 4/2009 | Dodge |
| 7,563,076 B2 | 7/2009 | Brunet |
| 7,581,379 B2 | 9/2009 | Yoshida |
| 7,675,189 B2 | 3/2010 | Grenier |
| 7,683,499 B2 | 3/2010 | Saucier |
| 7,717,193 B2 | 5/2010 | Egilsson et al. |
| 7,755,310 B2 | 7/2010 | West et al. |
| 7,807,048 B2 | 10/2010 | Collette |
| 7,835,140 B2 | 11/2010 | Mori |
| 7,845,413 B2 | 12/2010 | Shampine et al. |
| 7,926,562 B2 | 4/2011 | Poitzsch |
| 7,894,757 B2 | 7/2011 | Keast |
| 7,977,824 B2 | 7/2011 | Halen et al. |
| 8,037,936 B2 | 10/2011 | Neuroth |
| 8,054,084 B2 | 11/2011 | Schulz et al. |
| 8,083,504 B2 | 12/2011 | Williams |
| 8,096,354 B2 | 1/2012 | Poitzsch |
| 8,096,891 B2 | 1/2012 | Lochtefeld |
| 8,139,383 B2 | 3/2012 | Efraimsson |
| 8,146,665 B2 | 4/2012 | Neal |
| 8,154,419 B2 | 4/2012 | Daussin et al. |
| 8,232,892 B2 | 7/2012 | Overholt et al. |
| 8,261,528 B2 | 9/2012 | Chillar |
| 8,272,439 B2 | 9/2012 | Strickland |
| 8,310,272 B2 | 11/2012 | Quarto |
| 8,354,817 B2 | 1/2013 | Yeh et al. |
| 8,474,521 B2 | 7/2013 | Kajaria |
| 8,534,235 B2 | 9/2013 | Chandler |
| 8,573,303 B2 | 11/2013 | Kerfoot |
| 8,596,056 B2 | 12/2013 | Woodmansee |
| 8,616,005 B1 | 12/2013 | Cousino |
| 8,616,274 B2 | 12/2013 | Belcher et al. |
| 8,646,521 B2 | 2/2014 | Bowen |
| 8,692,408 B2 | 4/2014 | Zhang et al. |
| 8,727,068 B2 | 5/2014 | Bruin |
| 8,760,657 B2 | 6/2014 | Pope |
| 8,774,972 B2 | 7/2014 | Rusnak et al. |
| 8,789,601 B2 | 7/2014 | Broussard |
| 8,800,652 B2 | 8/2014 | Bartko |
| 8,807,960 B2 | 8/2014 | Stephenson |
| 8,838,341 B2 | 9/2014 | Kumano |
| 8,851,860 B1 | 10/2014 | Mail |
| 8,857,506 B2 | 10/2014 | Stone, Jr. |
| 8,899,940 B2 | 12/2014 | Laugemors |
| 8,905,056 B2 | 12/2014 | Kendrick |
| 8,905,138 B2 | 12/2014 | Lundstedt et al. |
| 8,997,904 B2 | 4/2015 | Cryer |
| 9,018,881 B2 | 4/2015 | Mao et al. |
| 9,051,822 B2 | 6/2015 | Ayan |
| 9,067,182 B2 | 6/2015 | Nichols |
| 9,103,193 B2 | 8/2015 | Coli |
| 9,119,326 B2 | 8/2015 | McDonnell |
| 9,121,257 B2 | 9/2015 | Coli et al. |
| 9,140,110 B2 | 9/2015 | Coli et al. |
| 9,160,168 B2 | 10/2015 | Chapel |
| 9,175,554 B1 | 11/2015 | Watson |
| 9,206,684 B2 | 12/2015 | Parra |
| 9,322,239 B2 | 4/2016 | Angeles Boza et al. |
| 9,366,114 B2 | 6/2016 | Coli et al. |
| 9,410,410 B2 | 8/2016 | Broussard et al. |
| 9,450,385 B2 | 9/2016 | Kristensen |
| 9,458,687 B2 | 10/2016 | Hallundbaek |
| 9,475,020 B2 | 10/2016 | Coli et al. |
| 9,475,021 B2 | 10/2016 | Coli et al. |
| 9,534,473 B2 | 1/2017 | Morris et al. |
| 9,562,420 B2 | 2/2017 | Morris et al. |

(56) References Cited

U.S. PATENT DOCUMENTS

| | | |
|---|---|---|
| 9,587,649 B2 | 3/2017 | Oehring |
| 9,611,728 B2 | 4/2017 | Oehring |
| 9,650,871 B2 | 5/2017 | Oehring et al. |
| 9,650,879 B2 | 5/2017 | Broussard et al. |
| 9,728,354 B2 | 8/2017 | Skolozdra |
| 9,738,461 B2 | 8/2017 | DeGaray |
| 9,745,840 B2 | 8/2017 | Oehring et al. |
| 9,840,901 B2 | 12/2017 | Oehring et al. |
| 9,863,228 B2 | 1/2018 | Shampine et al. |
| 9,893,500 B2 | 2/2018 | Oehring |
| 9,915,128 B2 | 3/2018 | Hunter |
| 9,932,799 B2 | 4/2018 | Symehuk |
| 9,963,961 B2 | 5/2018 | Hardin |
| 9,970,278 B2 | 5/2018 | Broussard |
| 9,976,351 B2 | 5/2018 | Randall |
| 9,995,218 B2 | 6/2018 | Oehring |
| 10,008,880 B2 | 6/2018 | Vicknair |
| 10,020,711 B2 | 7/2018 | Oehring |
| 10,036,238 B2 | 7/2018 | Oehring |
| 10,107,086 B2 | 10/2018 | Oehring |
| 10,119,381 B2 | 11/2018 | Oehring |
| 10,196,878 B2 | 2/2019 | Hunter |
| 10,227,854 B2 | 3/2019 | Glass |
| 10,232,332 B2 | 3/2019 | Oehring |
| 10,246,984 B2 | 4/2019 | Payne |
| 10,254,732 B2 | 4/2019 | Oehring |
| 10,260,327 B2 | 4/2019 | Kajaria |
| 10,280,724 B2 | 5/2019 | Hinderliter |
| 10,287,873 B2 | 5/2019 | Filas |
| 10,309,205 B2 | 6/2019 | Randall |
| 10,371,012 B2 | 8/2019 | Davis |
| 10,378,326 B2 | 8/2019 | Morris |
| 10,393,108 B2 | 8/2019 | Chong |
| 10,407,990 B2 | 9/2019 | Oehring |
| 10,436,026 B2 | 10/2019 | Ounadjela |
| 2002/0169523 A1 | 11/2002 | Ross et al. |
| 2003/0056514 A1 | 3/2003 | Lohn |
| 2003/0138327 A1 | 7/2003 | Jones et al. |
| 2004/0040746 A1 | 3/2004 | Niedermayr |
| 2004/0102109 A1 | 5/2004 | Cratty et al. |
| 2004/0167738 A1 | 8/2004 | Miller |
| 2005/0061548 A1 | 3/2005 | Hooper |
| 2005/0116541 A1 | 6/2005 | Seiver |
| 2005/0274508 A1 | 12/2005 | Folk |
| 2006/0052903 A1 | 3/2006 | Bassett |
| 2006/0260331 A1 | 11/2006 | Andreychuk |
| 2007/0131410 A1 | 6/2007 | Hill |
| 2007/0187163 A1 | 8/2007 | Cone |
| 2007/0201305 A1 | 8/2007 | Heilman et al. |
| 2007/0226089 A1 | 9/2007 | DeGaray et al. |
| 2007/0277982 A1 | 12/2007 | Shampine |
| 2007/0278140 A1 | 12/2007 | Mallet et al. |
| 2008/0017369 A1 | 1/2008 | Sarada |
| 2008/0041596 A1 | 2/2008 | Blount |
| 2008/0112802 A1 | 5/2008 | Orlando |
| 2008/0137266 A1 | 6/2008 | Jensen |
| 2008/0208478 A1 | 8/2008 | Ella et al. |
| 2008/0217024 A1 | 9/2008 | Moore |
| 2008/0236818 A1 | 10/2008 | Dykstra |
| 2008/0264625 A1 | 10/2008 | Ochoa |
| 2008/0264640 A1 | 10/2008 | Eslinger |
| 2008/0264649 A1 | 10/2008 | Crawford |
| 2009/0045782 A1 | 2/2009 | Datta |
| 2009/0065299 A1 | 3/2009 | Vito |
| 2009/0078410 A1 | 3/2009 | Krenek et al. |
| 2009/0090504 A1 | 4/2009 | Weightman |
| 2009/0093317 A1 | 4/2009 | Kajiwara et al. |
| 2009/0095482 A1 | 4/2009 | Surjaatmadja |
| 2009/0145611 A1 | 6/2009 | Pallini, Jr. |
| 2009/0153354 A1 | 6/2009 | Daussin et al. |
| 2009/0188181 A1 | 7/2009 | Forbis |
| 2009/0200035 A1 | 8/2009 | Bjerkreim et al. |
| 2009/0260826 A1 | 10/2009 | Sherwood |
| 2009/0308602 A1 | 12/2009 | Bruins et al. |
| 2010/0000508 A1 | 1/2010 | Chandler |
| 2010/0019574 A1 | 1/2010 | Baldassarre et al. |
| 2010/0038907 A1 | 2/2010 | Hunt |
| 2010/0045109 A1 | 2/2010 | Arnold |
| 2010/0051272 A1 | 3/2010 | Loree et al. |
| 2010/0101785 A1 | 4/2010 | Khvoshchev |
| 2010/0132949 A1 | 6/2010 | DeFosse et al. |
| 2010/0146981 A1 | 6/2010 | Motakef |
| 2010/0172202 A1 | 7/2010 | Borgstadt |
| 2010/0200224 A1 | 8/2010 | Nguete |
| 2010/0250139 A1 | 9/2010 | Hobbs et al. |
| 2010/0293973 A1 | 11/2010 | Erickson |
| 2010/0303655 A1 | 12/2010 | Scekic |
| 2010/0322802 A1 | 12/2010 | Kugelev |
| 2011/0005757 A1 | 1/2011 | Hebert |
| 2011/0017468 A1 | 1/2011 | Birch et al. |
| 2011/0061855 A1 | 3/2011 | Case et al. |
| 2011/0085924 A1 | 4/2011 | Shampine |
| 2011/0166046 A1 | 7/2011 | Weaver |
| 2011/0247878 A1 | 10/2011 | Rasheed |
| 2011/0272158 A1 | 11/2011 | Neal |
| 2012/0018016 A1 | 1/2012 | Gibson |
| 2012/0049625 A1 | 3/2012 | Hopwood |
| 2012/0085541 A1 | 4/2012 | Love et al. |
| 2012/0127635 A1 | 5/2012 | Grindeland |
| 2012/0205301 A1 | 8/2012 | McGuire et al. |
| 2012/0205400 A1 | 8/2012 | DeGaray et al. |
| 2012/0222865 A1 | 9/2012 | Larson |
| 2012/0232728 A1 | 9/2012 | Karimi et al. |
| 2012/0247783 A1 | 10/2012 | Berner, Jr. |
| 2012/0255734 A1 | 10/2012 | Coli et al. |
| 2013/0009469 A1 | 1/2013 | Gillett |
| 2013/0025706 A1 | 1/2013 | DeGaray et al. |
| 2013/0175038 A1 | 7/2013 | Conrad |
| 2013/0175039 A1 | 7/2013 | Guidry |
| 2013/0199617 A1 | 8/2013 | DeGaray et al. |
| 2013/0233542 A1 | 9/2013 | Shampine |
| 2013/0306322 A1 | 11/2013 | Sanborn et al. |
| 2013/0341029 A1 | 12/2013 | Roberts et al. |
| 2013/0343858 A1 | 12/2013 | Flusche |
| 2014/0000899 A1 | 1/2014 | Nevison |
| 2014/0010671 A1 | 1/2014 | Cryer et al. |
| 2014/0054965 A1 | 2/2014 | Jain |
| 2014/0060658 A1 | 3/2014 | Hains |
| 2014/0095114 A1 | 4/2014 | Thomeer |
| 2014/0096974 A1 | 4/2014 | Coli |
| 2014/0124162 A1 | 5/2014 | Leavitt |
| 2014/0138079 A1 | 5/2014 | Broussard et al. |
| 2014/0174717 A1 | 6/2014 | Broussard et al. |
| 2014/0219824 A1* | 8/2014 | Burnette ............... F04B 23/06 417/53 |
| 2014/0246211 A1 | 9/2014 | Guidry et al. |
| 2014/0251623 A1 | 9/2014 | Lestz et al. |
| 2014/0255214 A1 | 9/2014 | Burnette |
| 2014/0277772 A1 | 9/2014 | Lopez |
| 2014/0290768 A1 | 10/2014 | Randle |
| 2014/0379300 A1 | 12/2014 | Devine |
| 2015/0027712 A1 | 1/2015 | Vicknair |
| 2015/0053426 A1 | 2/2015 | Smith |
| 2015/0068724 A1 | 3/2015 | Coli et al. |
| 2015/0068754 A1 | 3/2015 | Coli et al. |
| 2015/0075778 A1 | 3/2015 | Walters |
| 2015/0083426 A1 | 3/2015 | Lesko |
| 2015/0097504 A1 | 4/2015 | Lamascus |
| 2015/0114652 A1 | 4/2015 | Lestz |
| 2015/0136043 A1 | 5/2015 | Shaaban |
| 2015/0144336 A1 | 5/2015 | Hardin et al. |
| 2015/0159911 A1 | 6/2015 | Holt |
| 2015/0175013 A1 | 6/2015 | Cryer et al. |
| 2015/0176386 A1 | 6/2015 | Castillo et al. |
| 2015/0211512 A1* | 7/2015 | Wiegman ............... F04B 49/20 417/2 |
| 2015/0211524 A1 | 7/2015 | Broussard |
| 2015/0217672 A1 | 8/2015 | Shampine |
| 2015/0225113 A1 | 8/2015 | Lungu |
| 2015/0252661 A1 | 9/2015 | Glass |
| 2015/0300145 A1 | 10/2015 | Coli et al. |
| 2015/0314225 A1 | 11/2015 | Coli et al. |
| 2015/0330172 A1 | 11/2015 | Allmaras |
| 2015/0354322 A1 | 12/2015 | Vicknair |

(56) References Cited

U.S. PATENT DOCUMENTS

| | | |
|---|---|---|
| 2016/0032703 A1 | 2/2016 | Broussard et al. |
| 2016/0102537 A1 | 4/2016 | Lopez |
| 2016/0105022 A1 | 4/2016 | Oehring |
| 2016/0208592 A1 | 4/2016 | Oehring |
| 2016/0160889 A1 | 6/2016 | Hoffman et al. |
| 2016/0177675 A1 | 6/2016 | Morris et al. |
| 2016/0177678 A1 | 6/2016 | Morris |
| 2016/0186531 A1 | 6/2016 | Harkless et al. |
| 2016/0208593 A1 | 7/2016 | Coli et al. |
| 2016/0208594 A1 | 7/2016 | Coli et al. |
| 2016/0208595 A1 | 7/2016 | Tang |
| 2016/0221220 A1 | 8/2016 | Paige |
| 2016/0230524 A1 | 8/2016 | Dumoit |
| 2016/0230525 A1 | 8/2016 | Lestz et al. |
| 2016/0258267 A1 | 9/2016 | Payne et al. |
| 2016/0265457 A1 | 9/2016 | Stephenson |
| 2016/0273328 A1 | 9/2016 | Oehring |
| 2016/0281484 A1* | 9/2016 | Lestz ............... C09K 8/60 |
| 2016/0290114 A1 | 10/2016 | Oehring |
| 2016/0290563 A1 | 10/2016 | Diggins |
| 2016/0312108 A1 | 10/2016 | Lestz et al. |
| 2016/0319650 A1 | 11/2016 | Oehring |
| 2016/0326854 A1 | 11/2016 | Broussard |
| 2016/0326855 A1 | 11/2016 | Coli et al. |
| 2016/0341281 A1 | 11/2016 | Brunvold et al. |
| 2016/0348479 A1 | 12/2016 | Oehring |
| 2016/0349728 A1 | 12/2016 | Oehring |
| 2016/0369609 A1 | 12/2016 | Morris et al. |
| 2017/0016433 A1 | 1/2017 | Chong |
| 2017/0021318 A1 | 1/2017 | McIver et al. |
| 2017/0022788 A1 | 1/2017 | Oehring et al. |
| 2017/0022807 A1 | 1/2017 | Dursun |
| 2017/0028368 A1 | 2/2017 | Oehring et al. |
| 2017/0030177 A1 | 2/2017 | Oehring et al. |
| 2017/0030178 A1 | 2/2017 | Oehring et al. |
| 2017/0036178 A1 | 2/2017 | Coli et al. |
| 2017/0036872 A1 | 2/2017 | Wallace et al. |
| 2017/0037717 A1 | 2/2017 | Oehring |
| 2017/0037718 A1 | 2/2017 | Coli et al. |
| 2017/0051732 A1 | 2/2017 | Hemandez et al. |
| 2017/0096885 A1 | 4/2017 | Oehring |
| 2017/0104389 A1 | 4/2017 | Morris et al. |
| 2017/0114625 A1 | 4/2017 | Norris |
| 2017/0145918 A1 | 5/2017 | Oehring |
| 2017/0146189 A1 | 5/2017 | Herman |
| 2017/0159570 A1 | 6/2017 | Bickert |
| 2017/0218727 A1 | 8/2017 | Oehring |
| 2017/0218843 A1 | 8/2017 | Oehring |
| 2017/0222409 A1 | 8/2017 | Oehring |
| 2017/0226839 A1 | 8/2017 | Broussard |
| 2017/0226842 A1 | 8/2017 | Omont |
| 2017/0234250 A1 | 8/2017 | Janik |
| 2017/0241221 A1 | 8/2017 | Seshadri |
| 2017/0259227 A1 | 9/2017 | Morris et al. |
| 2017/0292513 A1 | 10/2017 | Haddad |
| 2017/0313499 A1 | 11/2017 | Hughes et al. |
| 2017/0314380 A1 | 11/2017 | Oehring |
| 2017/0314979 A1 | 11/2017 | Ye |
| 2017/0328179 A1 | 11/2017 | Dykstra |
| 2017/0369258 A1 | 12/2017 | DeGaray |
| 2018/0028992 A1 | 2/2018 | Stegemoeller |
| 2018/0038216 A1 | 2/2018 | Zhang |
| 2018/0156210 A1 | 6/2018 | Oehring |
| 2018/0183219 A1 | 6/2018 | Oehring |
| 2018/0216455 A1 | 8/2018 | Andreychuk |
| 2018/0245428 A1 | 8/2018 | Richards |
| 2018/0258746 A1 | 9/2018 | Broussard |
| 2018/0274446 A1 | 9/2018 | Oehring |
| 2018/0320483 A1 | 11/2018 | Zhang |
| 2018/0363437 A1 | 12/2018 | Coli et al. |
| 2019/0003329 A1* | 1/2019 | Morris ............... E21B 21/062 |
| 2019/0010793 A1* | 1/2019 | Hinderliter ............... E21B 43/26 |
| 2019/0063309 A1 | 2/2019 | Davis |
| 2019/0100989 A1 | 4/2019 | Stewart |
| 2019/0112910 A1 | 4/2019 | Oehring |
| 2019/0120024 A1 | 4/2019 | Oehring |
| 2019/0128080 A1 | 5/2019 | Ross |
| 2019/0162061 A1 | 5/2019 | Stephenson |
| 2019/0169971 A1 | 6/2019 | Oehring |
| 2019/0178057 A1 | 6/2019 | Hunter |
| 2019/0178235 A1 | 6/2019 | Coskrey |
| 2019/0203567 A1 | 7/2019 | Ross |
| 2019/0203572 A1 | 7/2019 | Morris |
| 2019/0211661 A1 | 7/2019 | Reckels |
| 2019/0226317 A1 | 7/2019 | Payne |
| 2019/0245348 A1 | 8/2019 | Hinderliter |
| 2019/0292866 A1 | 9/2019 | Ross |
| 2019/0292891 A1 | 9/2019 | Kajaria |
| 2019/0316447 A1 | 10/2019 | Oehring |

FOREIGN PATENT DOCUMENTS

| | | |
|---|---|---|
| CA | 2707269 | 12/2010 |
| CA | 2482943 | 5/2011 |
| CA | 3050131 | 11/2011 |
| CA | 2955706 | 10/2012 |
| CA | 2966672 | 10/2012 |
| CA | 3000322 | 4/2013 |
| CA | 2787814 | 2/2014 |
| CA | 2833711 | 5/2014 |
| CA | 2978706 | 9/2016 |
| CA | 2944980 | 2/2017 |
| CA | 3006422 | 6/2017 |
| CA | 3018485 | 8/2017 |
| CA | 2964593 | 10/2017 |
| CA | 2849825 | 7/2018 |
| CA | 2919649 | 2/2019 |
| CA | 2919666 | 7/2019 |
| CA | 2797081 | 9/2019 |
| CA | 2945579 | 10/2019 |
| CN | 201687513 | 12/2010 |
| CN | 101977016 | 2/2011 |
| CN | 202023547 | 11/2011 |
| CN | 102602322 | 7/2012 |
| JP | 2004264589 | 9/2004 |
| WO | 2016/144939 | 9/2016 |
| WO | 2016/160458 | 10/2016 |

OTHER PUBLICATIONS

Non-Final Office Action issued in corresponding U.S. Appl. No. 15/293,681 dated Feb. 16, 2017.

Non-Final Office Action issued in corresponding U.S. Appl. No. 15/294,349 dated Mar. 14, 2017.

Final Office Action issued in corresponding U.S. Appl. No. 15/145,491 dated Jan. 20, 2017.

Non-Final Office Action issued in corresponding U.S. Appl. No. 15/145,443 dated Feb. 7, 2017.

Notice of Allowance issued in corresponding U.S. Appl. No. 15/217,040 dated Mar. 28, 2017.

Notice of Allowance issued in corresponding U.S. Appl. No. 14/622,532 dated Mar. 27, 2017.

Non-Final Office Action issued in corresponding U.S. Appl. No. 15/291,842 dated Jan. 6, 2017.

Final Office Action issued in corresponding U.S. Appl. No. 14/622,532 dated Dec. 7, 2016.

Non-Final Office Action issued in corresponding U.S. Appl. No. 14/622,532 dated May 17, 2016.

Final Office Action issued in corresponding U.S. Appl. No. 14/622,532 dated Dec. 21, 2015.

Non-Final Office Action issued in corresponding U.S. Appl. No. 14/622,532 dated Aug. 5, 2015.

Non-Final Office Action issued in corresponding U.S. Appl. No. 15/145,491 dated Sep. 12, 2016.

Non-Final Office Action issued in corresponding U.S. Appl. No. 15/217,040 dated Nov. 29, 2016.

Non-Final Office Action issued in corresponding U.S. Appl. No. 15/235,788 dated Dec. 14, 2016.

Non-Final Office Action issued in corresponding U.S. Appl. No. 15/145,491 dated May 15, 2017.

(56) References Cited

OTHER PUBLICATIONS

Non-Final Office Action issued in corresponding U.S. Appl. No. 15/486,970 dated Jun. 22, 2017.
Non-Final Office Action issued in corresponding U.S. Appl. No. 15/487,656 dated Jun. 23, 2017.
Non-Final Office Action issued in corresponding U.S. Appl. No. 15/487,694 dated Jun. 26, 2017.
Final Office Action issued in corresponding U.S. Appl. No. 15/294,349 dated Jul. 6, 2017.
Non-Final Office Action issued in corresponding U.S. Appl. No. 14/884,363 dated Sep. 5, 2017.
Final Office Action issued in corresponding U.S. Appl. No. 15/145,491 dated Sep. 6, 2017.
Non-Final Office Action issued in corresponding U.S. Appl. No. 14/881,535 dated Oct. 6, 2017.
Non-Final Office Action issued in corresponding U.S. Appl. No. 15/145,414 dated Nov. 29, 2017.
Non-Final Office Action issued in corresponding U.S. Appl. No. 15/644,487 dated Nov. 13, 2017.
Canadian Office Action dated Mar. 2, 2018 in related Canadian Patent Application No. 2,833,711.
Office Action dated Apr. 10, 2018 in related U.S. Appl. No. 15/294,349.
Office Action dated Apr. 2, 2018 in related U.S. Appl. No. 15/183,387.
Office Action dated May 29, 2018 in related U.S. Appl. No. 15/235,716.
Candian Office Action dated Apr. 18, 2018 in related Canadian Patent Application No. 2,928,711.
Canadian Office Action dated Jun. 22, 2018 in related Canadian Patent Application No. 2,886,697.
Office Action dated Jul. 25, 2018 in related U.S. Appl. No. 15/644,487.
Office Action dated Oct. 4, 2018 in related U.S. Appl. No. 15/217,081.
International Search Report and Written Opinion dated Sep. 19, 2018 in related PCT Patent Application No. PCT/US2018/040683.
Canadian Office Action dated Sep. 28, 2018 in related Canadian Patent Application No. 2,945,281.
Office Action dated Dec. 12, 2018 in related U.S. Appl. No. 16/160,708.
International Search Report and Written Opinion dated Jan. 2, 2019 in related PCT Patent Application No. PCT/US18/54542.
International Search Report and Written Opinion dated Jan. 2, 2019 in related PCT Patent Application No. PCT/US18/54548.
International Search Report and Written Opinion dated Dec. 31, 2018 in related PCT Patent Application No. PCT/US18/55913.
International Search Report and Written Opinion dated Jan. 4, 2019 in related PCT Patent Application No. PCT/US18/57539.
International Search Report and Written Opinion dated Apr. 10, 2019 in corresponding PCT Application No. PCT/US2019/016635.
Notice of Allowance dated Apr. 23, 2019 in corresponding U.S. Appl. No. 15/635,028.
Schlumberger, "Jet Manual 23, Fracturing Pump Units, SPF/SPS-343, Version 1.0," Jan. 31, 2007, 68 pages.
Stewart & Stevenson, "Stimulation Systems," 2007, 20 pages.
Luis Gamboa, "Variable Frequency Drives in Oil and Gas Pumping Systems," Dec. 17, 2011, 5 pages.

"Griswold Model 811 Pumps: Installation, Operation and Maintenance Manual, ANSI Process Pump," 2010, 60 pages.
Non-Final Office Action dated Feb. 12, 2019 in related U.S. Appl. No. 16/170,695.
International Search Report and Written Opinion dated Feb. 15, 2019 in related PCT Application No. PCT/US18/63977.
International Search Report and Written Opinion dated Mar. 5, 2019 in related PCT Application No. PCT/US18/63970.
Non-Final Office Action dated Mar. 6, 2019 in related U.S. Appl. No. 15/183,387.
Office Action dated Jan. 30, 2019 in related Canadian Patent Application No. 2,936,997.
Office Action dated Mar. 1, 2019 in related Canadian Patent Application No. 2,943,275.
International Search Report and Written Opinion dated Jul. 9, 2019 in corresponding PCT Application No. PCT/US2019/027584.
Canadian Office Action dated Oct. 1, 2019 in related Canadian Patent Application No. 2,936,997.
Office Action dated May 10, 2019 in corresponding U.S. Appl. No. 16/268,030.
Canadian Office Action dated May 30, 2019 in corresponding CA Application No. 2,833,711.
Canadian Office Action dated Jun. 20, 2019 in corresponding CA Application No. 2,964,597.
Office Action dated Jun. 7, 2019 in corresponding U.S. Appl. No. 16/268,030.
International Search Report and Written Opinion dated Sep. 11, 2019 in related PCT Application No. PCT/US2019/037493.
Office Action dated Aug. 19, 2019 in related U.S. Appl. No. 15/356,436.
Office Action dated Oct. 2, 2019 in related U.S. Appl. No. 16/152,732.
Office Action dated Sep. 11, 2019 in related U.S. Appl. No. 16/268,030.
Office Action dated Oct. 11, 2019 in related U.S. Appl. No. 16/385,070.
Office Action dated Sep. 3, 2019 in related U.S. Appl. No. 15/994,772.
Office Action dated Sep. 20, 2019 in related U.S. Appl. No. 16/443,273.
International Search Report and Written Opinion dated Jan. 2, 2020 in related PCT Application No. PCT/US19/55325.
Notice of Allowance dated Jan. 9, 2020 in related U.S. Appl. No. 16/570,331.
Non-Final Office Action dated Dec. 23, 2019 in related U.S. Appl. No. 16/597,008.
Non-Final Office Action dated Jan. 10, 2020 in related U.S. Appl. No. 16/597,014.
Non-Final Office Action dated Dec. 6, 2019 in related U.S. Appl. No. 16/564,186.
International Search Report and Written Opinion dated Nov. 26, 2019 in related PCT Application No. PCT/US19/51018.
Non-Final Office Action issued in U.S. Appl. No. 16/152,695 dated Mar. 3, 2020.
International Search Report and Written Opinion issued in Application No. PCT/US2019/055323 dated Feb. 11, 2020.

* cited by examiner

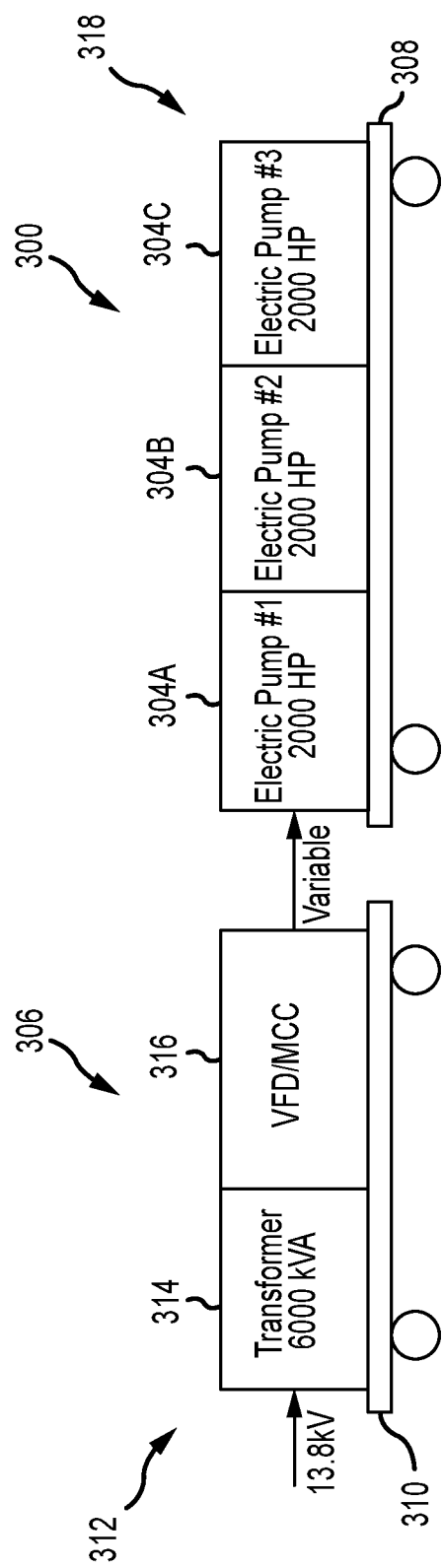
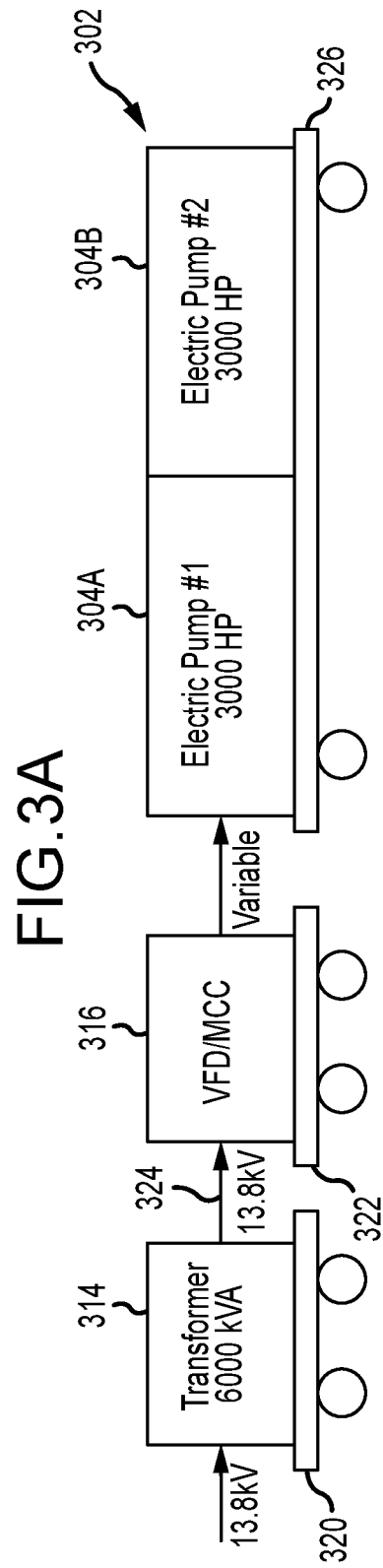
FIG.3A
FIG.3B

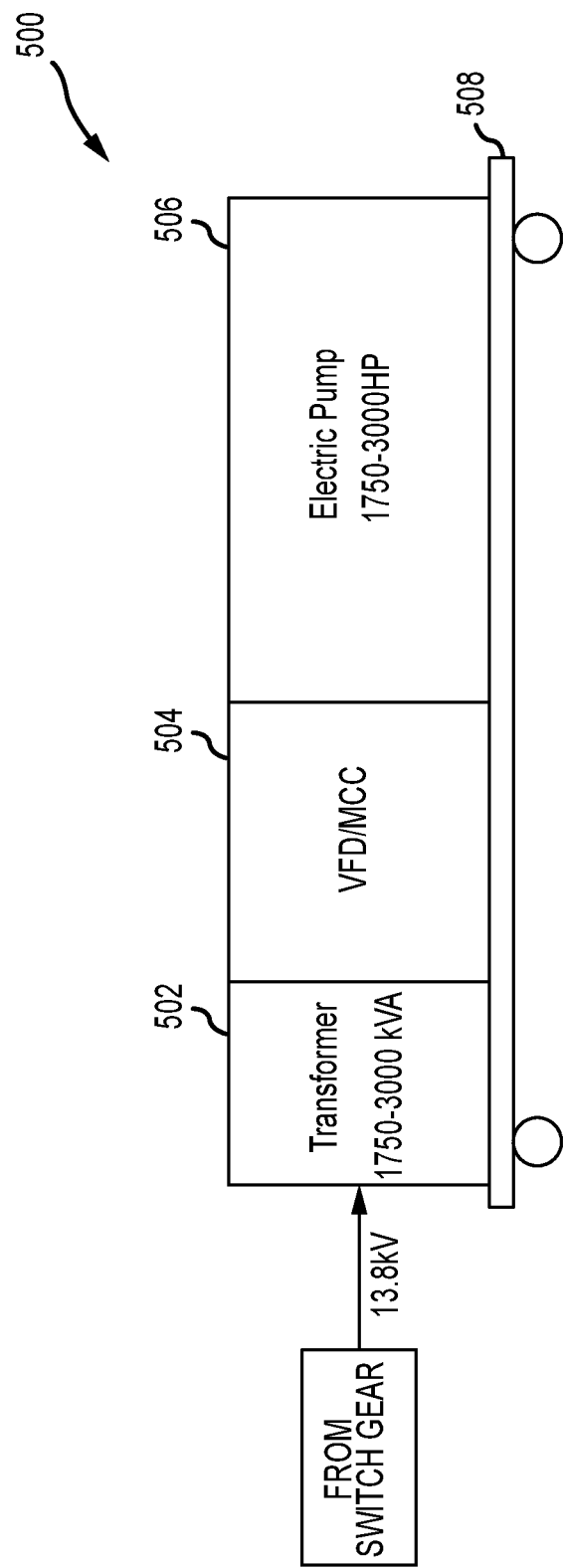

HIGH HORSEPOWER PUMPING CONFIGURATION FOR AN ELECTRIC HYDRAULIC FRACTURING SYSTEM

CROSS REFERENCE TO RELATED APPLICATIONS

This application claims priority to and the benefit of U.S. Provisional Application Ser. No. 62/594,925 filed Dec. 5, 2017 titled "HIGH HORSEPOWER PUMPING CONFIGURATION FOR AN ELECTRIC HYDRAULIC FRACTURING SYSTEM" and U.S. Provisional Application Ser. No. 62/595,411 filed Dec. 6, 2017 titled "HIGH HORSEPOWER PUMPING CONFIGURATION FOR AN ELECTRIC HYDRAULIC FRACTURING SYSTEM" the full disclosures of which are hereby incorporated herein by reference in their entirety for all purposes.

BACKGROUND

1. Technical Field

This disclosure relates generally to hydraulic fracturing and more particularly to systems and methods for configuring high horsepower pumping systems.

2. Background

With advancements in technology over the past few decades, the ability to reach unconventional sources of hydrocarbons has tremendously increased. Horizontal drilling and hydraulic fracturing are two such ways that new developments in technology have led to hydrocarbon production from previously unreachable shale formations. Hydraulic fracturing (fracturing) operations typically require powering numerous components in order to recover oil and gas resources from the ground. For example, hydraulic fracturing usually includes pumps that inject fracturing fluid down the wellbore, blenders that mix proppant, chemicals, and the like into the fluid, cranes, wireline units, and many other components that all perform different functions to carry out fracturing operations.

Usually in fracturing systems, the fracturing equipment runs on diesel motors or by other internal combustion engines. Such engines may be very powerful, but have certain disadvantages. Diesel is more expensive, is less environmentally friendly, less safe, and heavier to transport than natural gas. For example, diesel engines are very heavy, and so require the use of a large amount of heavy equipment, including trailers and trucks, to transport the engines to and from a well site. In addition, such engines are not clean, generating large amounts of exhaust and pollutants that may cause environmental hazards, and are extremely loud, among other problems. Onsite refueling, especially during operations, presents increased risks of fuel leaks, fires, and other accidents. The large amounts of diesel fuel needed to power traditional fracturing operations require constant transportation and delivery by diesel tankers onto the well site, resulting in significant carbon dioxide emissions.

Some systems have tried to eliminate partial reliance on diesel by creating bi-fuel systems. These systems blend natural gas and diesel, but have not been very successful. It is thus desirable that a natural gas powered fracturing system be used in order to improve safety, save costs, and provide benefits to the environment over diesel powered systems. Turbine use is well known as a power source, but is not typically employed for powering mobile fracturing operations.

Some electric pumping configurations have a limited horsepower (HP) range, such as between approximately 1750 HP and 2500 HP. This contrasts diesel powered pumping configurations which may include horsepower ranges between 2250 HP and 3000 HP. Fracturing operations with high horsepower configurations which desire the benefits of electric powered pumps typically supplement with smaller diesel powered configurations, which may reduce or eliminate the numerous benefits provided by electric powered pumps. Moreover, rig up times may be increased because two different types of pumping configurations are transported and installed at the well site.

SUMMARY

Applicant recognized the problems noted above herein and conceived and developed embodiments of systems and methods, according to the present disclosure, for operating electric fracturing pumps.

In an embodiment a hydraulic fracturing system for fracturing a subterranean formation includes an electric pump, arranged on a first support structure, the electric pump coupled to a well associated with the subterranean formation and powered by at least one electric motor, and configured to pump fluid into a wellbore associated with the well at a high pressure so that the fluid passes from the wellbore into the subterranean formation and fractures the subterranean formation. The system also includes support equipment, arranged on a second support structure, electrically coupled to the electric pump, wherein the support equipment includes at least a transformer for distributing power to the electric pump, the power being received from at least one generator at a voltage higher than an operating voltage of the electric pump.

In an embodiment a hydraulic fracturing system for fracturing a subterranean formation includes a first support structure, forming a pumping trailer. The first support structure includes an electric pump fluidly connected to a well associated with the subterranean formation and configured to pump fluid into a wellbore associated with the well at a high pressure so that the fluid passes from the wellbore into the subterranean formation and fractures the subterranean formation. The first support structure also includes at least one electric motor providing operational energy to the electric pump. The first support structure further includes a first support component, the first support component regulating operation of the electric pump. The system also includes a second support structure, forming a support trailer. The second support structure includes a second support component, the second support component regulating electric power transmission to the electric pump.

In an embodiment a hydraulic fracturing system for fracturing a subterranean formation includes at least one generator and at least one switch gear receiving electrical power from the generator. The system also includes an electric pump, arranged on a first support structure, the electric pump coupled to a well associated with the subterranean formation and powered by at least one electric motor arranged on the first support structure, the electric pump configured to pump fluid into a wellbore associated with the well at a high pressure so that the fluid passes from the wellbore into the subterranean formation and fractures the subterranean formation. The system also includes a transformer, arranged on a second support structure, positioned between the switch gear and at least one electric motor, the transformer reducing a voltage output from the at least one switchgear.

BRIEF DESCRIPTION OF DRAWINGS

The present technology will be better understood on reading the following detailed description of non-limiting embodiments thereof, and on examining the accompanying drawings, in which:

FIG. 3A is a schematic block diagram of an embodiment of a pumping configuration, in accordance with embodiments of the present disclosure;

FIG. 3B is a schematic block diagram of an embodiment of a pumping configuration, in accordance with embodiments of the present disclosure;

FIG. 5 is a schematic block diagram of an embodiment of a pumping configuration, in accordance with embodiments of the present disclosure;

Figure 1:
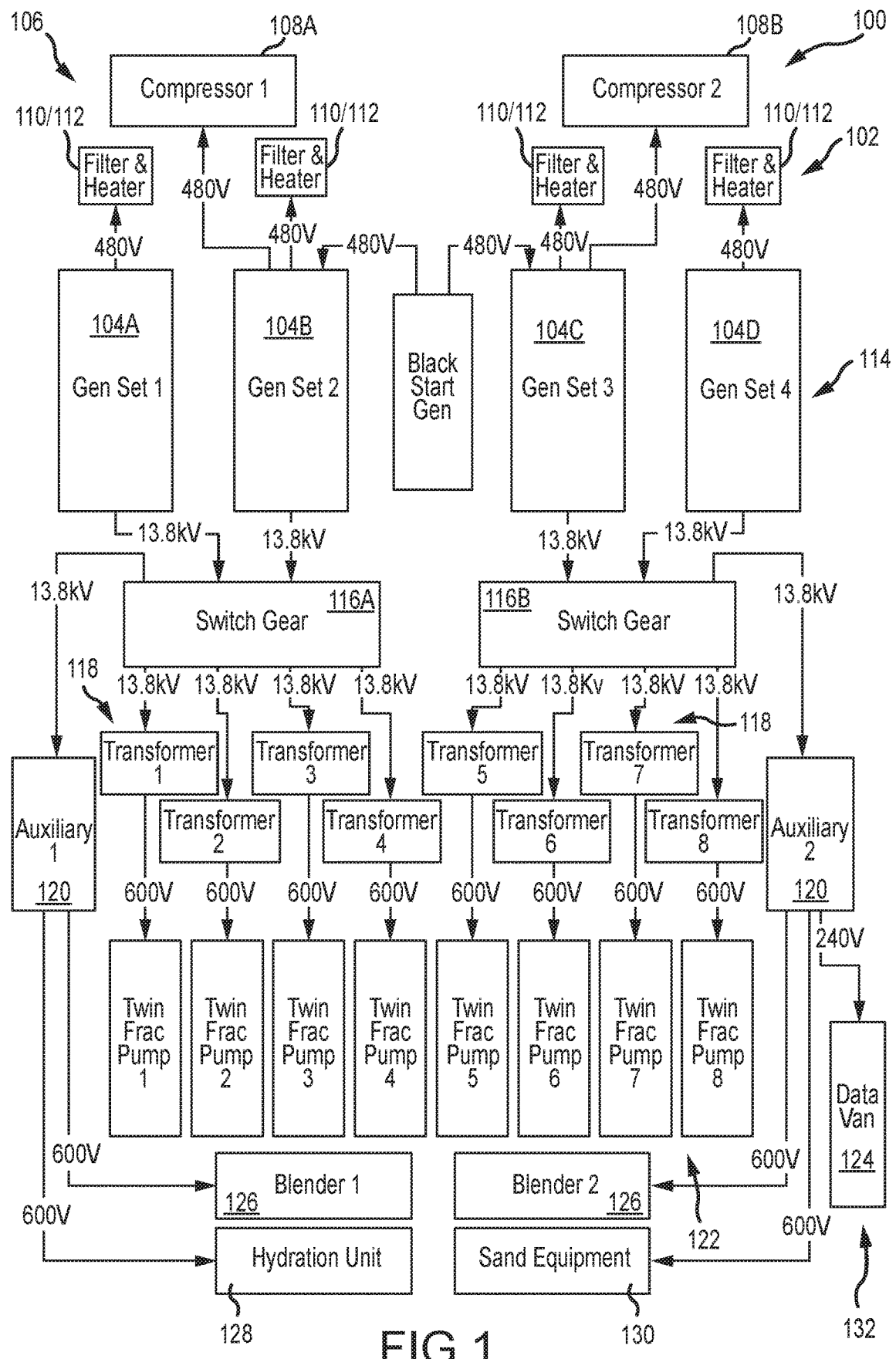
FIG. 1 is a schematic block diagram of an embodiment of a hydraulic fracturing system, in accordance with embodiments of the present disclosure.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Additionally, recitations of steps of a method should be understood as being capable of being performed in any order unless specifically stated otherwise. Furthermore, the steps may be performed in series or in parallel unless specifically stated otherwise.

Embodiments of the present disclosure describe systems and methods for various pump configurations to produce greater horsepower (HP) output with a smaller footprint at a well site. In certain embodiments, various components may be arranged on a common support structure, such as a trailer or skid. For example, the trailer may include a transformer, variable frequency drive (VFD), and pump. In such embodiments, the total area available for pumps on the trailer may be decreased due to the support equipment, and as a result, the horsepower output from the pump may be reduced because of its size. In various embodiments, a separate skid or trailer may be utilized for certain support components to thereby enable larger pumps or more pumps to be positioned on the pump trailer to increase the total horsepower output and reduce the number of pump trailers arranged at the well site.

Embodiments of the present disclosure describe systems and methods for pumping configurations utilizing electric powered pumps that produce horsepower greater than or equal to diesel-powered pumping configuration. As described above, diesel-powered systems are noisy and generate pollution. Moreover, transportation of fuel to well sites may be costly and availability of fuel may delay or otherwise bottleneck fracturing operations. In various embodiments, electric pumping configurations include trailers or skids with a pump and a VFD mounted on a single skid or trailer. In certain embodiments, the VFD may be moved to a separate auxiliary skid to increase the room available on the trailer or skid housing the pump. As a result, multiple pumps may be situated on the skid or trailer, or larger pumps may be situated on the skid or trailer. In various embodiments, a single trailer or skid may have a capacity for a 6000+HP output utilizing a variety of configurations such as a single pump with multiple electric motors, a single motor powering a large pump, a large motor powering multiple electric pumps, or the like.

In various embodiments, the pumps utilized with the disclosed configurations may include non-standard fluid ends (e.g., a fluid manifold with valves and seats to isolate a suction side and high pressure discharge side without allowing back flow). By way of example only, the fluid ends may include more than 3 plungers (e.g., triplex) or more than 5 plungers (e.g., quintaplex) or plunger stroke lengths longer than 11 inches. For example, the fluid ends may be septenplex (7 plungers), novenplex (9 plungers), undenplex (11 plungers), tredenplex (13 lungers), or include any other reasonable number of plungers. Size constraints and the like have produced difficulty utilizing such pumps in other systems. However, by adjusting the position of various support equipment for the pumps, such as VFDs, transformers, and motor control centers (MCCs), the trailer or skid may have sufficient size to accommodate larger or non-standard pumps for use with hydraulic fracturing.

In various embodiments, the pumping configurations described herein may include a support skid. This support skid may include auxiliary components for operating the pumps, such as the VFDs, transformers, MCCs, and the like to thereby free up space on the skid or trailer housing the pumps for various additional different configurations, such as more pumps or larger pumps. While referred to herein as "support skids" it should be appreciated that the components associated with the support skids may be mounted on a skid or trailer. That is, the term "support skid" should not be interpreted as limiting the base or support structure to only a skid and other support structures, such as pads, trailers, truck beds, and the like may also be utilized and fall within the scope of the embodiments disclosed herein. Moreover, references to "pump trailers" should be interpreted as including embodiments where the support structure for the pumps and/or associated pumping equipment includes a trailer, a skid, a pad, a truck bed, or any other reasonable support structure.

Various embodiments utilize VFDs in order to control and monitor operation of the electric fracturing pumps. The VFDs may include soft stalls for improved operation. The soft stall allows the VFD to "disengage" the motor for a short amount of time (such as milliseconds) instead of tripping the VFD off to protect the drive and motor. Due to fluctuations in the wellhead pressure and pump fluid rate, if the VFD is near its upper limitations on torque a small fluctuation of pressure can cause the VFD to "trip" or shut down to protect itself to prevent damage. The soft stalls allow the VFD to stall temporarily then reengage the motor instead of shutting down completely. These "soft stalls" are unnoticed by the operator and are so quick that total fluid rate is not affected. This feature allows operation of the VFDs and motors at higher horsepower without fear of suffering an unexpected shutdown. Rated hydraulic horsepower (HHP) may be increased from 1,600 HP to 1,700 HP. In various embodiments, the soft stall is a software setting implemented as an executable instruction stored on a nontransitory machine readable memory and initiated by an associated processor of a control system.

FIG. 1 is a simplified block diagram of an embodiment of a hydraulic fracturing system 100. In the illustrated embodiment, a power generation section 102 includes four turbine generators 104A-D arranged to produce electrical energy at approximately 13.8 kV and generate more than approximately 20 MW of power depending on demand, size, and the like. That is, different types of generators may be arranged at the well site and produce different quantities of electrical energy. For instance, the generators may produce electrical energy at approximately 600 V, 4,160 V, or any other reasonable voltage output. Furthermore, different sizes of generators may be utilized in order to accommodate size and space restrictions at the well site. The illustrated embodiment further includes support equipment 106 for the turbine generators 104A-D, such as compressors 108, filters 110, heaters 112, and the like. It should be appreciated that other equipment, such as electronic equipment rooms and the like, have been omitted for clarity.

The illustrated embodiment further includes a power distribution section 114 including switch gears 116A, 116B for protection and distribution, as well as step down transformers 118 and auxiliary units 120. As shown, the generators 104A-D produce electrical energy at 13.8 kV for transmission to the switch gear 116A, 116B. Thereafter, the step down transformers 118 receive and convert the energy to 600 V, which is distributed to pumps 122. As shown, the auxiliary units 120 are utilized to step down the energy for the associated fracturing equipment, such as a data van 124, blender 126, a hydration unit 128, and sand equipment 130. In various embodiments, the auxiliary units may include transformers to step down the energy to 600 V, 240 V, or any other reasonable voltage output.

Continuing with FIG. 1, the illustrated embodiment further includes hydraulic fracturing equipment, such as the illustrated pumps 122, data van 124, blenders 126, hydration unit 128, and sand equipment 130. It should be appreciated that various components have been simplified and/or removed for clarity. Moreover, the embodiment illustrated in FIG. 1 is not intended to be limiting. For instance, more than 8 twin frac pumps may be arranged at the well site. Moreover, multiple data vans, blenders, sand equipment, and hydration units may be utilized. The illustrated pumps 122 are twin frac pumps. The twin frac pumps may be arranged on a common skid or trailer and receive energy from the transformers 118. It should be appreciated that the pumps 122 may be configured to operate at different voltages, such as 600 V, 13.8 kV, 4,160 V, or any reasonable voltage. Moreover, in embodiments the pumps 122 may be singular pumps mounted on a trailer or skid. However, in embodiments that utilize the twin frac pumps, the trailer or skid may include two fully independent, electrically powered fluid pumps. In various embodiments, the illustrated fleet is capable of generating approximately 16,000 HP for fracturing jobs. As will be described below, different configurations, for example of the pumps, may enable more than approximately 20,000 HP.

Figure 2:
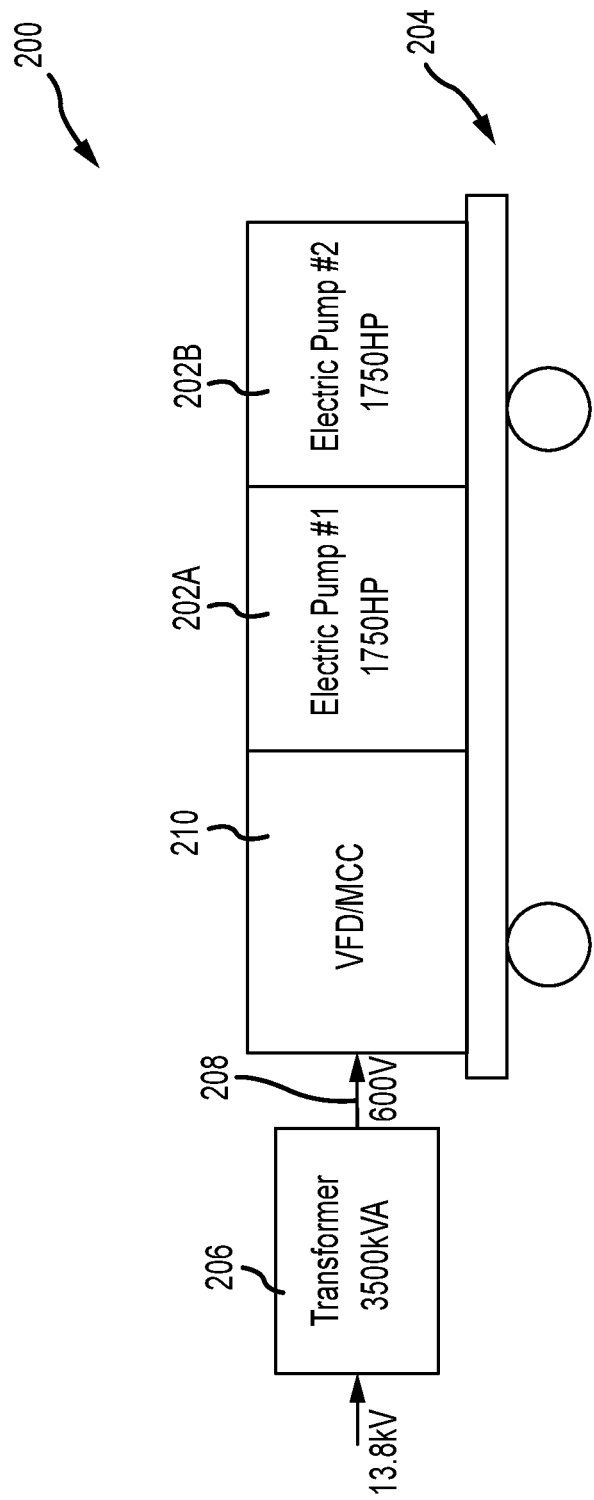
FIG. 2 is a schematic block diagram of an embodiment of a pumping configuration, in accordance with embodiments of the present disclosure.

FIG. 2 is a schematic diagram of an embodiment of a twin frac pump trailer 200. It should be appreciated that twin frac pumps 202A, 202B may also be arranged on a skid, pad, bed, or any other reasonable support structure 204. As illustrated, a transformer 206 steps down electrical energy from 13.8 kV to 600 V and may be rated for approximately 3500 kVA. The 600 V power is transmitted to the pumps 202A, 202B, for example via cabling 208, through a VFD and MCC 210. In various embodiments, the VFD and MCC 210 are arranged on the same support structure 204 (e.g., trailer, skid, pad, bed, etc.) as the dual electric fracturing pumps illustrated in FIG. 2. It should be appreciated that while the VFD and MCC 210 are illustrated as a single unit in the illustrated embodiment, in other embodiments the VFD and MCC may be separate and distinct units, which may not be both arranged on the support structure 204. The illustrated pumps 202A, 202B produce approximately 1,750 HP, which allows for the trailer to have a combined output of approximately 3,500 HP. It should be appreciated that various components have been eliminated for clarity. For example, each fluid pump 202A, 202B may include an electric motor, motor cooling equipment, a power end, a lube oil cooler, a fluid end, and the like. In embodiments, the additional equipment may be arranged on the same support structure 204. However, in various embodiments, the additional equipment may be on an auxiliary or separate support structure.

In various embodiments, hydraulic fracturing jobs may utilize upwards of 28,000 HP. Accordingly, utilizing the configuration illustrated in FIG. 2 would lead to approximately 8 twin frac pump trailers 200 at the site, as illustrated in FIG. 1. This configuration may take up significant space, which may be limited at various fracturing sites. Moreover, mobilizing and demobilizing the equipment may be time consuming. Accordingly, various embodiments disclosed herein may be utilized to produce more horsepower per pump trailer to thereby reduce the number of pump trailers at the site.

FIGS. 3A and 3B are schematic diagrams of embodiments of frac pump trailer configurations 300, 302 which may produce approximately 6,000 HP. As shown in FIG. 3A, pumps 304A, 304B, 304C and the support equipment 306 have been separated onto two different support structures 308, 310, for example two different trailers. A first trailer 312 includes a transformer 314 for stepping down the 13.8 kV voltage. As described above, in various embodiments the voltage may be stepped down to 600 V, however it should be appreciated that different output voltages may be utilized. The first trailer 312 also includes the VFD/MCC 316 for controlling operation of the electric motor powering the pumps. As noted above, the VFD/MCC 316 may be integrated into a singular unit or may be separate and distinct units. FIG. 3A also illustrates a second trailer 318 having three electric pumps 304A-C. The illustrated pumps are rated for approximately 2,000 HP each, thereby providing a configuration to produce approximately 6,000 HP. The embodiment illustrated in FIG. 3A may include various cabling and instrumentation permanently mounted to the first trailer 312 for supporting the transformer 314 and VFD/MCC 316. As a result, connections may be simplified at the site because separate cabling and the like will not be run between the transformer 314 and the VFD/MCC 316. Moreover, simplified connections via power cables may be used to transmit power to the electric pumps 304A-C, thereby reducing the likelihood of misconnections at the well site and improving reliability.

FIG. 3B illustrates a configuration in which the transformer and VFD/MCC are on different support structures, such as different skids or trailers. For example, the illustrated transformer 314 is arranged separate from the VFD/MCC 316, for example on different support structures 320, 322. Accordingly, cabling 324 and the like may be arranged between the transformer 314 and the VFD/MCC 316 to enable transmission of electrical energy. Furthermore, illustrated on a separate support structure 326 such as a trailer or skid, is a pair of electric pumps 304A, 304B rated for approximately 3,000 HP. Because there are fewer pumps 304A, 304B on the trailer 326, compared to FIG. 3A, larger pumps may be utilized, which enables the pump trailer 302 to produce approximately 6,000 HP total. Accordingly, using the embodiments illustrated in FIGS. 3A and 3B, producing approximately 28,000 HP will utilize approximately 5 trailers, as opposed to 8, for example using the configuration of FIG. 2. As a result, the system may have a smaller footprint at the site and also have less equipment to connect, disconnect, and move.

Figure 4A:
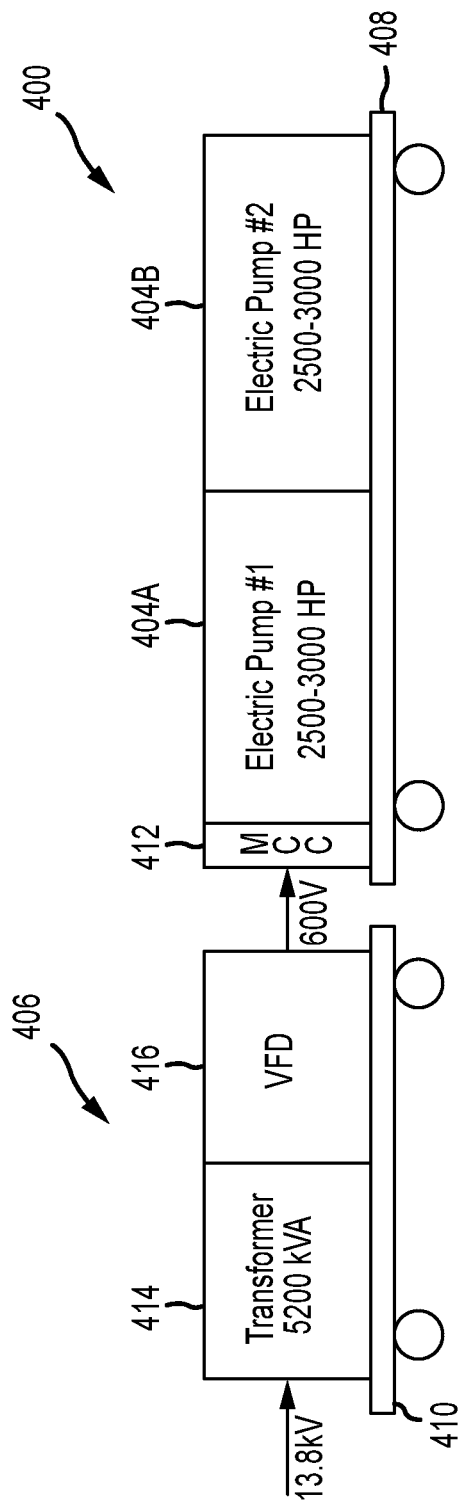
FIG. 4A is a schematic block diagram of an embodiment of a pumping configuration, in accordance with embodiments of the present disclosure.
Figure 4B:
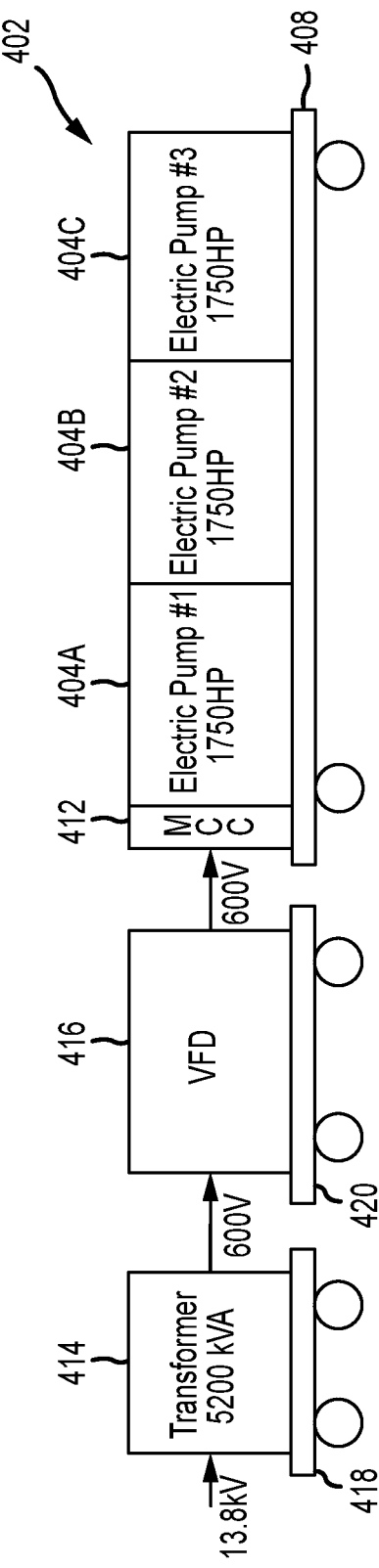
FIG. 4B is a schematic block diagram of an embodiment of a pumping configuration, in accordance with embodiments of the present disclosure.

FIGS. 4A and 4B are schematic diagrams of embodiments of frac pump trailer configurations 400, 402 which may produce approximately 5,000-6,000 HP. As shown in FIG. 4A, the pumps 404A, 404B and the support equipment 406 have been substantially separated onto two different support structures 408, 410, for example two different trailers. A notable difference from FIG. 3A is the inclusion of an MCC 412 on the trailer 408 supporting the pair of pumps 404A, 404B, rather than on the trailer 410 for the support equipment 406. While this configuration occupies additional space on the pump trailer, it enables improved and efficient cable management and increase electrical safety. With the MCC 412 on the pump trailer 408, only power and some communication cables will be used between the auxiliary trailers and the pump trailers. In various embodiments, the MCC 416 will include breakers to distribute power to equipment components both large and small. In various embodiments, the equipment may include lights, heaters, blowers, small pumps, control computers, motors, and the like.

In the illustrated embodiment, the support structure 410 with the support equipment 406 (which may be referred to as a support trailer) includes a transformer 414 for stepping down the 13.8 kV energy. As described above, in various embodiments the voltage may be stepped down to 600 V, however it should be appreciated that different output voltages may be utilized. The support trailer also includes a VFD 416 for controlling operation of the electric motor or motors (not shown) powering the pumps 404A, 404B. FIG. 4A also illustrates the support structure 408 with the pumps 404A, 404B (which may be referred to as a pump trailer), as described above. The pump trailer includes the pair of electric pumps 404A, 404B and the MCC 412. The illustrated pumps 404A, 404B are rated for approximately 2,500-3,000 HP each, thereby providing a configuration to produce approximately 5,000-6,000 HP. As described above, because there are only two pumps on the trailers the pumps may be larger and therefore capable of producing additional power output.

FIG. 4B illustrates the configuration in which the transformer 414 and VFD 416 are on different support structures, 418, 420 such as different skids or trailers. Additionally, the MCC 412 is mounted on the same trailer 408 as the pumps 404A-C, as described above with respect to FIG. 4A. For example, the illustrated transformer 414 is arranged separate from the VFD 416, for example on different support structures 418, 420. Accordingly, cabling and the like may be arranged between the transformer 414 and the VFD 416 to enable transmission of electrical energy. Furthermore, illustrated on the separate support structure 408, such as a trailer or skid, is three electric pumps 404A-C rated for approximately 1,750 HP and the MCC 412. Because there are more pumps 404A-C on the trailer 408, each pump 404A-C may be smaller than configurations with fewer pumps. Additionally, as described above, the MCC 412 occupies space on the trailer, but provides improved and efficient cabling. The embodiment illustrated in FIG. 4B may produce approximately 5,250 HP. Accordingly, using the embodiments illustrated in FIGS. 4A and 4B, producing approximately 28,000 HP will utilize approximately 5 or 6 trailers, as opposed to 8. As a result, the system may have a smaller footprint at the site and also have less equipment to connect, disconnect, and move.

FIG. 5 is a schematic diagram of an embodiment of a frac pump trailer configuration 500 which may produce approximately 3,000 HP. In the illustrated embodiment, a transformer 502, VFD/MCC 504, and electric pump 506 are all located on a common support structure 508, such as a trailer or skid. Because of the support equipment arranged on the trailer 508, the size of the pump 506 may be reduced, and therefore produces between approximately 1,750 and 3,000

HP. The configuration illustrated in FIG. 5 enables permanent cabling to be installed on the trailer to facilitate connection at the well site. For example, power may be transmitted to the trailer from the switch gear, as illustrated in FIG. 5. Accordingly, the embodiment illustrated in FIG. 5 provides a compact and simplified configuration at the well site.

Figure 6:
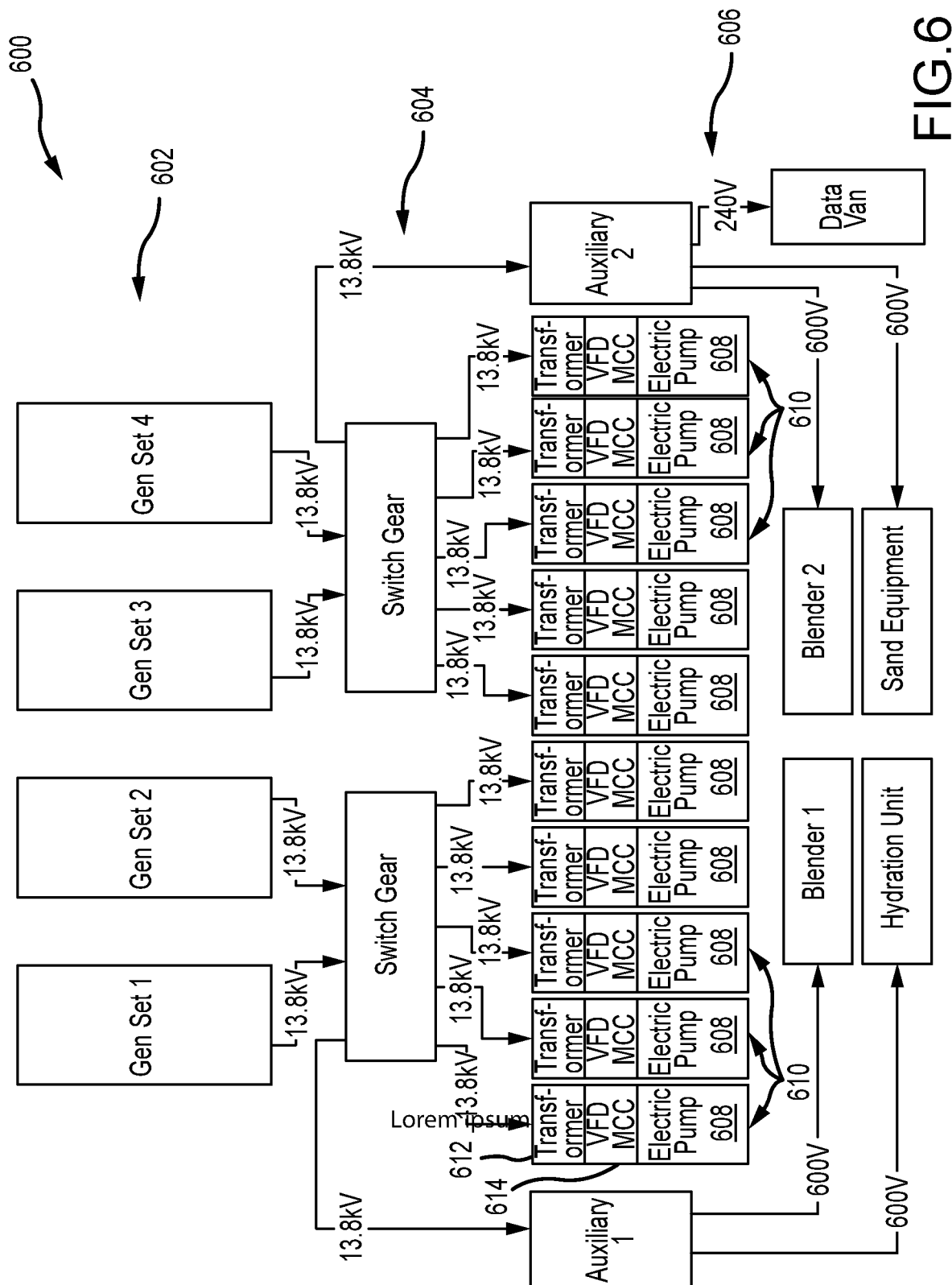
FIG. 6 is a schematic block diagram of an embodiment of a hydraulic fracturing system, in accordance with embodiments of the present disclosure.

FIG. 6 is a schematic diagram of an embodiment of a hydraulic fracturing system 600 including a power generation section 602, a power distribution section 604, and hydraulic fracturing equipment 606. The illustrated embodiment includes hydraulic fracturing pumps 608, for example mounted on a common trailer or skid 610 with a transformer 612 and VFD and MCC 614, in a configuration to produce approximately 30,000 HP. As illustrated, there are 10 different frac pump trailers 610, which may have the same configuration illustrated in FIG. 5. By incorporating the embodiment illustrated in FIG. 5, the separate transformers illustrated in FIG. 1 have been removed because the transformers 612 are already included with the pump trailers 610. Accordingly, a more compact configuration may be arranged at the well site.

Figure 7:
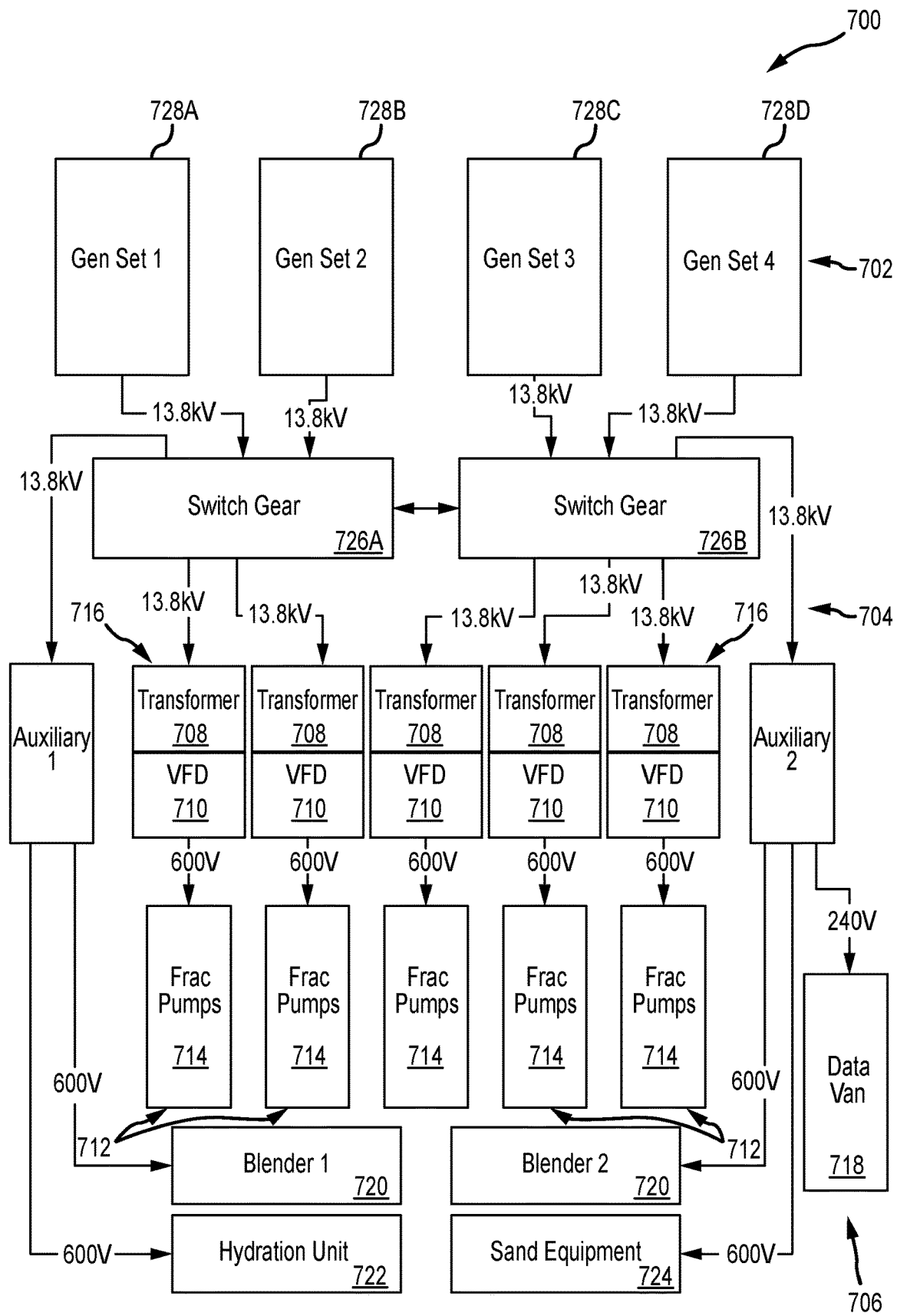
FIG. 7 is a schematic block diagram of an embodiment of a hydraulic fracturing system, in accordance with embodiments of the present disclosure.

FIG. 7 is a schematic diagram of an embodiment of a hydraulic fracturing system 700 including a power generation section 702, a power distribution section 704, and hydraulic fracturing equipment 706, as described in detail above. The illustrated embodiment may produce approximately 30,000 HP. As shown, a transformer 708 and VFD 710 are removed from the frac pump trailers 712 that support one or more pumps 714 and are supported separately, for example via a separate trailer or skid 716. In various embodiments, the MCC may be incorporated into the trailer 712 supporting the pumps 714 or the trailer 716 supporting the transformer 708 and VFD 710, as described above. As shown, the illustrated configuration includes 5 frac pump trailers, and in various embodiments a single large pump on the frac pump trailer 712, a pair of frac pumps, three frac pumps, or any reasonable number in order to produce the particularly selected amount of horsepower. The illustrated embodiment further includes the auxiliary units for supplying electrical energy to the support equipment, such as the data van 718, blenders 720, hydration unit 722, and sand equipment 724, as described above.

Further illustrated in the power distribution section 704 is load sharing between the switch gear 726 to keep the load balanced across the generators 728A-D. This balance may be achieved even though there are an unequal number of pump trailers utilized in the system. That is, a first switch gear 726A may transmit energy to two different frac pump trailers and a second switch gear 726b may transmit energy to three different frac pump trailers.

It should be appreciated that various embodiments of the components of the present disclosure may utilize a variety of equipment in order to achieve a desired end. For example, the pumps described herein may be magnetic coil, reciprocating, centrifugal, positive displacement, rotary (e.g., gear pumps, screw pumps, rotary vane pumps), progressing cavity, roots-type, peristaltic, plunger, hydraulic ram, velocity, or any other reasonable type of pumps. Moreover, the VFDs may be housed within an enclosure having an internal air conditioned space for technicians. In various embodiments, the VFD enclosures may no longer be a "house" and rather be panels that are weather and oil-field condition proof (e.g., blast proof, water proof, dust proof, etc.). Accordingly, the size of the housing may be decreased as the technicians may access the exterior panels while standing beside the trailers or skids.

Various embodiments may include a support skid, trailer, or body load, as described above, to free up space on the pump trailers (e.g., pump skid, pump pad, etc.) for additional pumps and/or larger pumps. As described above, it should be appreciated that references to a "support skid" may also refer to a support trailer, a support pad, a body load, or any other reasonable configuration. By way of example only, the support skid may include a main transformer, such as a step down transformer to take power down from 13.8 kV on the primary side (e.g., inlet) to 4,160 V on the secondary side (e.g., outlet). Furthermore, the transformer and/or support skid may include a bus, which may be common or separate, to feed the VFD and the MCC.

Figure 8A:
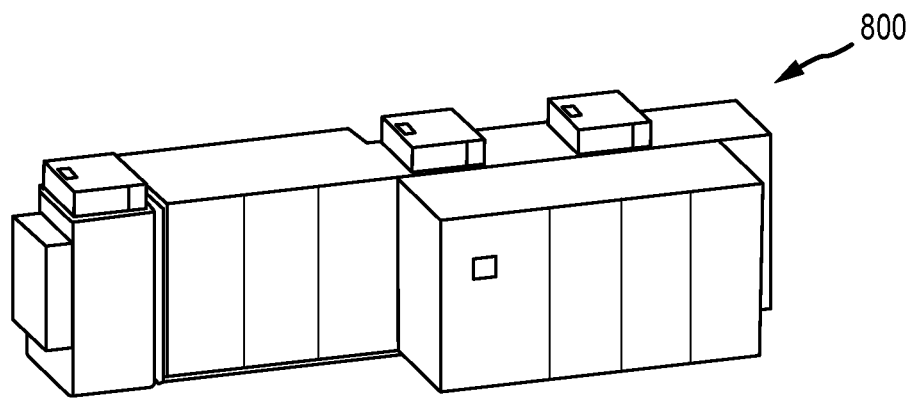
FIG. 8A is a schematic perspective view of an embodiment of an enclosure, in accordance with embodiments of the present disclosure.
Figure 8B:
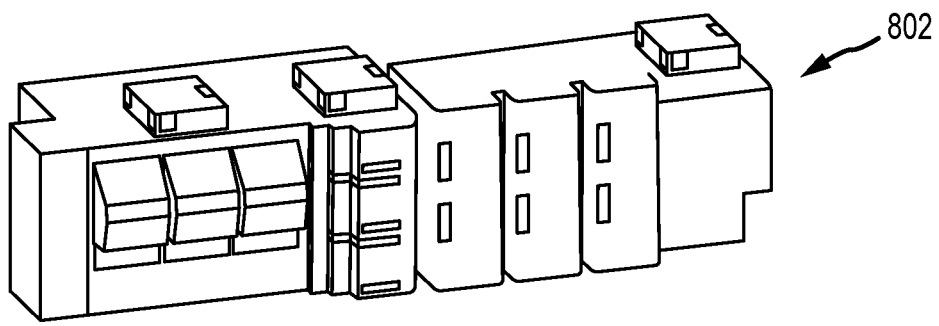
FIG. 8B is a schematic perspective view of an embodiment of an enclosure, in accordance with embodiments of the present disclosure.

FIGS. 8A and 8B are schematic perspective views of embodiments of enclosures 800, 802 for VFD assemblies. As described above, in various embodiments the VFDs may be housed within enclosures that include weather-proof and/or oil field condition-proof configurations, such as being blast proof or dust proof. The illustrated embodiment includes an outdoor medium voltage adjustable speed drive and an advanced enclosure design and power section topology. Namely, the illustrated embodiments are particularly designed for mounting in remote locations, such as harsh environments including desert or oil-field conditions. It should be appreciated that alternative embodiments may not have an integrated outdoor enclosure.

Figure 9:
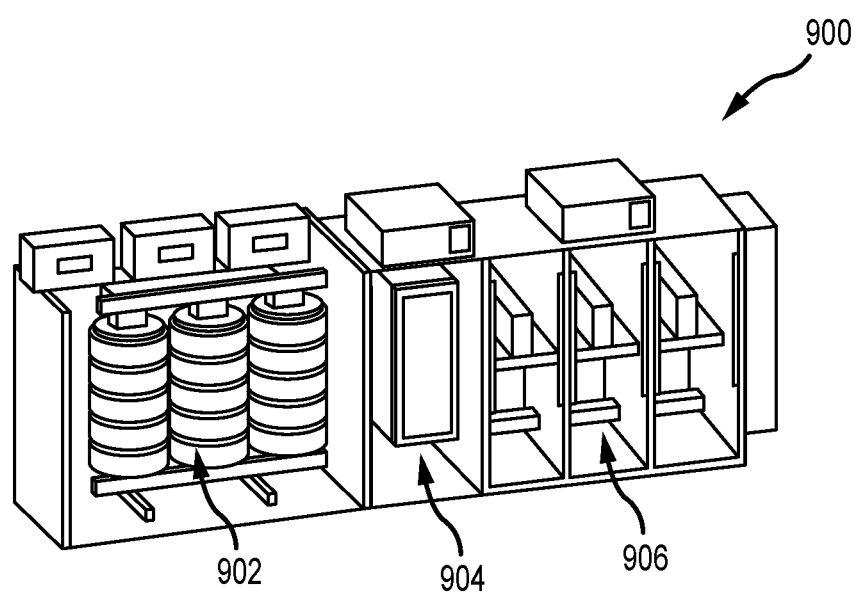
FIG. 9 is a partial schematic perspective view of an embodiment of an enclosure, in accordance with embodiments of the present disclosure.

FIG. 9 is a schematic partial perspective view of the enclosure for the VFD assembly 900 illustrating the transformer section 902, rectifier/control section 904, and inverter/output section 906. In various embodiments, the VFD assembly 900 may include one or more features or controls to enable low harmonics, meeting or exceeding IEEE 519-2014 specifications. Moreover, the VFD assembly 900 may further enable a higher true power factor (e.g., greater than 0.95) than configurations that run motors across the line. In various embodiments, an advanced user interface design enables operators to interact with the VFD assembly 900 to control or monitor operations.

In various embodiments, the VFD assembly 900 may operate in temperatures from −45 degrees C. to 50 degrees C., thereby providing flexibility in operations. Moreover, the VFD assembly 900 may be configured to enable operation with standard motors without the need for special motor insulation or cables. In order to provide predictability in operations, the VFD assembly 900 may be designed with a ten-year mean time between failures, thereby enabling operators to plan for maintenance activities.

Furthermore, in various embodiments the VFD assembly 900 incorporates an enclosure cooling system (not pictured) with a combination of air-to-air heat exchangers along with forced air cooling of the power modules. Utilizing a totally enclosed cooling system where no (or nearly no) exchange of internal air and external air occurs enables the internal drive components to remain clean and uncontaminated from the environment, which may include pollutants or dust. Accordingly, the costs and challenges associated with filter maintenance to keep the pollutants or dust out of the enclosure are eliminated.

Embodiments of the VFD assembly 900 further include a copper-wound input isolation transformer that provides 36 pulse phase-shift harmonic cancellation that meets or exceeds IEEE 519-2014. This isolation transformer may function similarly to a linear load on the incoming AC line. The soft charge reactor on the primary side of the isolation transformer maximizes the longevity of the transformer and minimizes the in rush current on weak grid systems.

Additionally, embodiments of the VFD assembly 900 further include a five-level NPC PWM output that closely simulates a true sine wave, which minimizes motor failures caused by insulation stress and long lead-length issues. The output waveform topology may be suitable for use on existing non-inverter duty motors without upgrading the motor insulation system.

In various embodiments, the VFD assembly 900 utilizes advanced IGBT technology with robust multi-level topology and controls with a fast industrial processor. Furthermore, an LCD Electronic Operator Interface enables quick, user-friendly programming. In various embodiments, faults are logged containing date and time steps. Furthermore, programming inputs and outputs are included to meet specific application needs. Moreover, the VFD assembly 900 may further include software to capture, extract, and compress full operating data at the time of a fault. This track-back data allows users to capture data with ease for detailed fault analysis, which can be submitted for remote diagnostics and support. In various embodiments, the VFD assembly 900 and associated software will include functional capabilities to communicate with one or more of DeviceNet, EtherNet/IP, Modbus RTU, Modbus TCP, Profibus, Tosline-S20, TCNet, and Ethernet Global Data (EGD).

In various embodiments, the VFD assembly 900 may further include features to streamline operations or provide improved diagnostic information. These features may include, communication cards, door-mounted equipment such as meters, pilot lights, speed potentiometer, and switches, direct online bypass, motor protection relay, RTD monitor, dV/dt or sine wave output filters, a solid state starter bypass, and multiple motors synchronous transfer and capture. Furthermore, features such as synchronous motor control (AC Brushless/DC Brush Type) and drive and motor space heater may also be incorporated. Additionally, an optional walk-in enclosure for power electronic components may be utilized. In embodiments, the VFD assembly may also include a voltage source inverter (VSI) with V/f Control and PID control and induction motor sensorless vector control synchronous motor sensorless Vector Control, and Closed Loop Vector Control (Using Pulse Generator Encoder or Resolver).

As described above, in various embodiments the VFD is utilized to control the one or more motors that operate the electric frac pumps. Specifications for the VFDs may include 3,500 HP-6,000 HP drive (one embodiment would be two 3,500 HP drives powering two 3,000-3,500 HP pumps) (another embodiment would be one 6,000 HP drive powering one 6,000 HP pump), output frequency of 0-120 HZ, and a control method including a five-level pulse-width modulation (PWM) output control with neutral-point clamping (NPC). Additionally, the VFD may include V/Hz Control such as V/Hz, sensorless vector control, variable torque, closed-loop vector control, and constant torque. In embodiments the VFD has a rotary encoder integrated into EOI. The VFD may also be used to protect the motor and/or the pumps via current limits, overcurrent, overload, undervoltage, overvoltage, ground fault, CPU error, and soft stall. In certain embodiments, the VFD may include speed regulation in the open loop up to 0.5% and the closed loop up to 0.1%. Further the VFD may include an overload current rating of 100% continuous or 115% for one minute every 20 minutes.

As described above, the VFD assembly may be operable via a control interface that enables operators to monitor and control the VFDs. The VFD control interface may include digital input, such as ten discrete inputs with programmable functions. It may also include digital output, such as ten available digital programmable outputs. In various embodiments, the VFD control interface includes analog input, such as three selectable currents (0/4 to 20 mA) or voltage (0-10 VDC) input signals. It may also include analog outputs, such as three to eight selectable output current (0/4 to 20 mA) or voltage (0-10 VDC). In certain embodiments, the control interface further includes communication ports, for example, Profibus, Modbus RTU & TCP, TOSLINE-S20, TCNet, Ethernet Global Data (EGD), DeviceNet & EtherNet/IP. Furthermore, the control interface may include safety features such as a standard pad-lockable input fuse disconnect switch with vacuum contactor, interlocked doors, and viewing window.

Furthermore, in various embodiments, each VFD will also be able to be controlled remotely via a wired or wireless control from the hydraulic fracturing data van control module or a remote suitcase. Moreover, a local display may be included. In embodiments, the local display is a 4-digit, 7-segment LED display and 4×20 character graphical plain English back-lit LCD display for programming, monitoring, and diagnostics. Furthermore, local LED indicators may be included, such as run (red)/stop (green) and local (green). Additionally, embodiments may incorporate local keys, such as local/remote, enter, mon/Prg, Esc, Run, and Stop/Reset, and monitoring. The monitoring may relay information to a frequency command screen, and display parameters such as motor current, motor speed, motor voltage, dc voltage, input voltage, output voltage, run time, output power, motor kW, motor kWH, motor kVAH, motor kVAR, and on-time Control power. In various embodiments, the above-described outdoor enclosure is NEMA 3R, free standing, and provides front-access only. Additionally, the outdoor enclosure may have bottom-entry power cables for input as well as the above-described forced-air cooling. In various embodiments, components of the present disclosure comply with standards and compliances such as NEC, NEMA, UL, ULC, ANSI, & American Recovery & Reinvestment Act Compliant.

Figure 10:
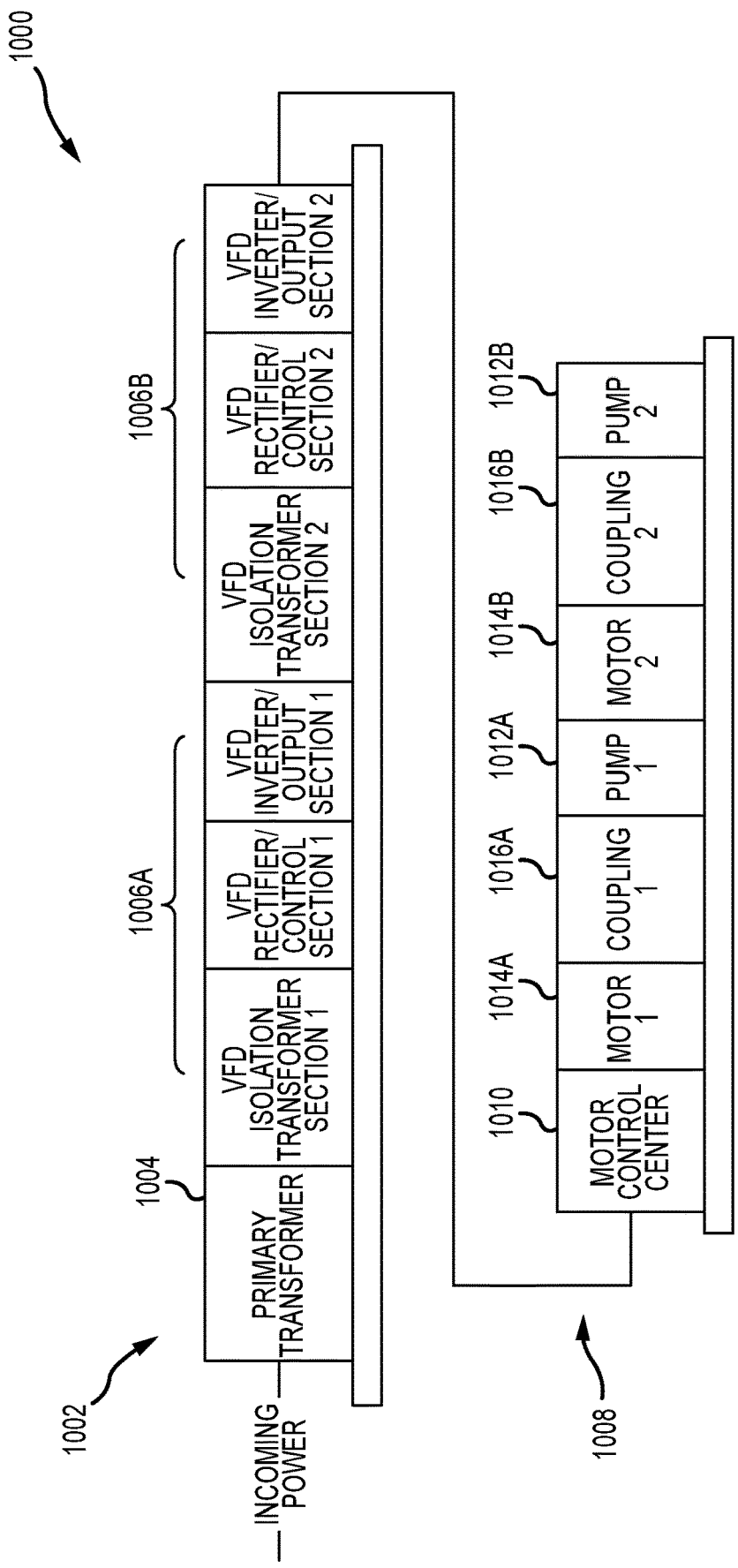
FIG. 10 is a schematic block diagram of an embodiment of a pumping configuration, in accordance with embodiments of the present disclosure.

FIG. 10 is a schematic diagram of an embodiment of a power distribution configuration 1000. In the illustrated embodiment, a first trailer or skid 1002, which may be referred to as a support skid, includes a primary transformer 1004 and two VFDs 1006A, 1006B. As shown, the VFDs each include a VFD isolation transformer, a VFD rectifier/control, and a VFD inverter/output. This support skid supplies electrical energy to a second trailer or skid 1008, which may be referred to as a frac pump trailer, that includes an MCC 1010 and a pair of pumps 1012A, 1012B with associated motors 1014A, 1014B and couplings 1016A, 1016B. The pair of pumps 1012A, 1012B may each be rated at or about 3,000 HP. In the illustrated embodiment, each VFD 1006A, 1006B of the support skid 1002 is utilized to control and monitor operations of a respective motor 1014A, 1014B powering one of the pumps 1012A, 1012B on the frac pump trailer 1008. Accordingly, as described above, there is additional space available on the frac pump trailer 1008, due to the removal of elements such as the transformer or VFDs, and therefore more or larger pumps may be arranged on the frac pump trailer 1008.

Figure 11:
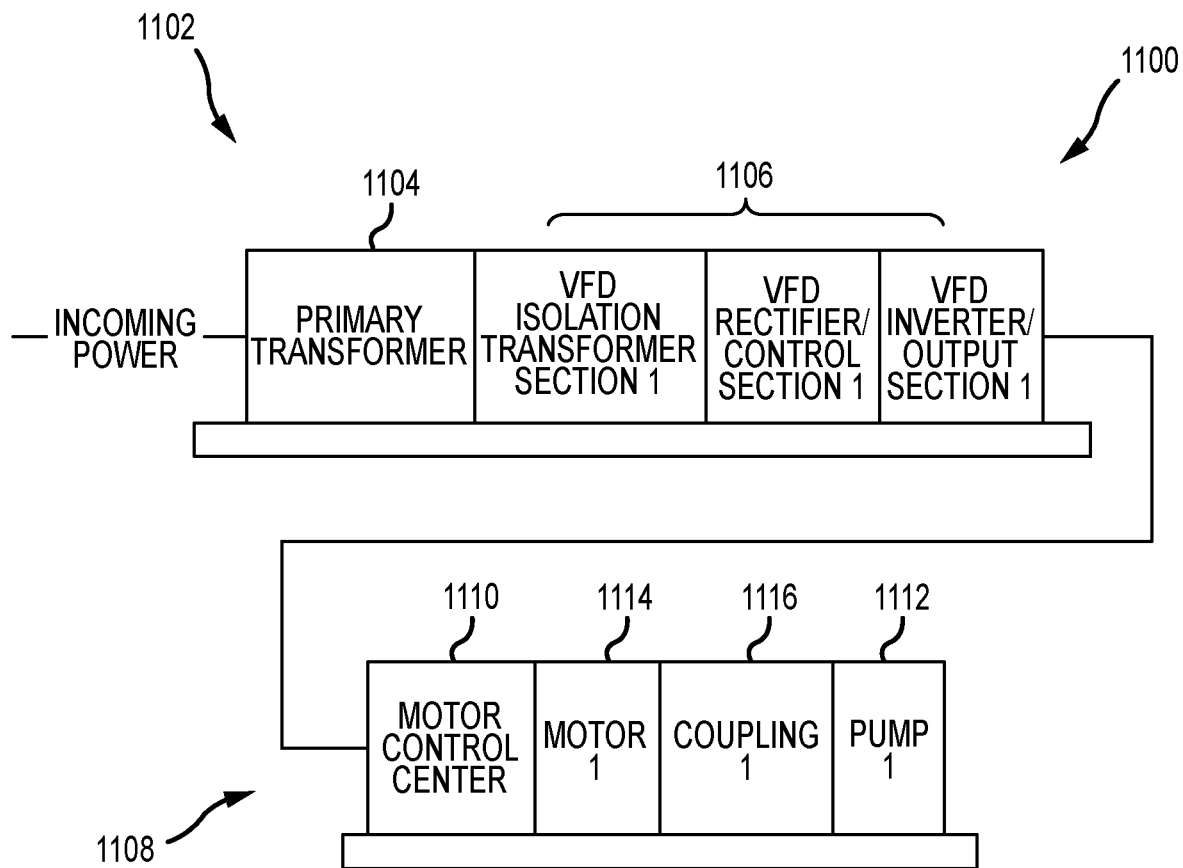
FIG. 11 is a schematic block diagram of an embodiment of a pumping configuration, in accordance with embodiments of the present disclosure.

FIG. 11 is a schematic diagram of an embodiment of a power distribution and pumping configuration 1100. The illustrated embodiment includes the first trailer 1102, which may be a support skid, having the primary transfer 1104 and a VFD 1106. The illustrated VFD 1106 includes the isolation transformer section, the rectifier/control section, and the inverter/output section. The support skid 1102 supplies power and controls the motor of the second trailer 1108, which may be a frac pump trailer. The illustrated frac pump trailer 1108 includes the MCC 1110 and a single pump 1112, which further includes a motor 1114 and coupling 1116. The illustrated pump 1112 may be rated for 6,000 HP. As described above, removing one or more components from the frac pump trailer enables larger pumps. Compared to the embodiment illustrated in FIG. 10 with the dual pumping configuration, the embodiment illustrated in FIG. 11 may have a larger pump having a larger horsepower capability.

It should be appreciated that while various embodiments described herein discuss voltages such as 4,160 V or 13.8 kV that other voltages may be utilized. For example, other options may include 600 V, 480 V, 240 V, or any other voltage that may be utilized commercially. Frequency can be approximately 50 Hz or 60 Hz. Moreover, in embodiments, the turbine generators may each produce approximately 5.7 MW of electricity. However, other turbine generators producing less electricity or more electricity may be utilized. Additionally, it should be appreciated that the power can be broken up into one or more banks. Moreover, in embodiments, the generators and/or the equipment may be particularly selected based on the power output or generate of the other. For example, in embodiments the generators may produce power at 4,160 V and the associated equipment may also operate at 4,160 V. In other embodiments, the generators may produce power at 600 V and the associated equipment may also operate at 600 V. In other embodiments, the generators may produce power at 13.8 kV and the associated equipment may also operate at 13.8 kV. Additionally, as described above, various transformers may be utilized to step down voltages to enable equipment operating at different voltages to be incorporated into various pumping configurations.

The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

The invention claimed is:

1. A hydraulic fracturing system for fracturing a subterranean formation, comprising:
   three electric pumps, arranged on a first support structure, the three electric pumps coupled to a well associated with the subterranean formation and powered by at least one electric motor, and configured to pump fluid into a wellbore associated with the well at a high pressure so that the fluid passes from the wellbore into the subterranean formation and fractures the subterranean formation; and
   support equipment, arranged on a second support structure, electrically coupled to the three electric pumps, wherein the support equipment includes at least a transformer for distributing power to at least one of the three electric pumps and a control system for monitoring or controlling one or more operational parameters of the three electric pumps, the power being received from at least one generator at a voltage higher than a respective operating voltage of the three electric pumps, the second support structure having integrated instrumentation and cabling for coupling the transformer and the control system.

2. The system of claim 1, wherein the second support structure is separated from and distinct from the first support structure.

3. The system of claim 1, wherein the first support structure and the second support structure are at least one of a trailer, a skid, a pad, a truck bed, or a combination thereof.

4. The system of claim 1, further comprising:
   a variable frequency drive connected to the at least one electric motor to control the speed of the at least one electric motor.

5. The system of 4, wherein the control system comprises the variable frequency drive.

6. The system of claim 1, wherein the three electric pumps have a combined horsepower of between 5,000 and 6,000 horsepower.

7. The system of claim 1, further comprising:
   a switch gear positioned separate from the second support structure and between the at least one generator and the transformer.

8. A hydraulic fracturing system for fracturing a subterranean formation, comprising:
   a first support structure, forming a pumping trailer, comprising:
      three electric pumps fluidly connected to a well associated with the subterranean formation and configured to pump fluid into a wellbore associated with the well at a high pressure so that the fluid passes from the wellbore into the subterranean formation and fractures the subterranean formation;
      at least one electric motor providing operational energy to the three electric pumps;
      a first support component, the first support component regulating operation of at least one of the three electric pumps; and
      a cable management system, associated with the first support structure, for coupling the three electric pumps to the at least one electric motor and the first support component; and
   a second support structure, forming a support trailer, comprising:
      a second support component, the second support component regulating electric power transmission to at least one of the three electric pumps; and
      a control system for monitoring or controlling one or more operational parameters of the three electric pumps, the second support structure having integrated instrumentation and cabling for coupling the second support component and the control system.

9. The system of claim 8, wherein the second support component comprises at least one of a transformer, a variable frequency drive, or a motor control center.

10. The system of claim 8, wherein the first support structure and the second support structure are separate components arranged remote from and not in contact with one another.

11. The system of claim 8, wherein the first support structure and the second support structure are at least one of a trailer, a skid, a pad, a truck bed, or a combination thereof.

12. The system of claim 8, wherein the second support component is a transformer for distributing power to at least one of the three electric pumps, the power being received from at least one generator at a voltage higher than a respective operating voltage of the three electric pumps.

13. The system of claim 8, wherein the three electric pumps have a combined horsepower of between 5,000 and 6,000 horsepower.

14. The system of claim 8, wherein a respective pump of the three electric pumps has a horsepower rating of between approximately 1,750 and approximately 3,000.

15. The system of claim 8, further comprising a plurality of pumping trailers and a plurality of support trailers arranged at well site, wherein a combined horsepower of the respective electric pumps of the plurality of pumping trailers is approximately 30,000.

16. The system of claim 8, wherein the first support component comprises at least one of a transformer, a variable frequency drive, or a motor control center.

17. A hydraulic fracturing system for fracturing a subterranean formation, comprising:

at least one generator;

at least one switch gear receiving electrical power from the generator;

three electric pumps, arranged on a first support structure, the three electric pumps coupled to a well associated with the subterranean formation and powered by at least one electric motor arranged on the first support structure, the three electric pumps configured to pump fluid into a wellbore associated with the well at a high pressure so that the fluid passes from the wellbore into the subterranean formation and fractures the subterranean formation;

a transformer, arranged on a second support structure, positioned between the switch gear and at least one electric motor, the transformer reducing a voltage output from the at least one switchgear; and a control system, arranged on the second support structure, for monitoring or controlling one or more operational parameters of the three electric pumps, the second support structure having integrated instrumentation and cabling for coupling the transformer and the control system.

18. The system of claim 17, wherein the first support structure and the second support structure are separate components arranged remote from and not in contact with one another.

19. The system of claim 17, wherein the first support structure and the second support structure are at least one of a trailer, a skid, a pad, a truck bed, or a combination thereof.

20. The system of claim 17, wherein the three electric pumps have a combined horsepower of between 5,000 and 6,000 horsepower.

* * * * *